US012744629B2

(12) United States Patent
Gao et al.

(10) Patent No.: US 12,744,629 B2

(45) Date of Patent: Sep. 22, 2026

(54) COMMUNICATION METHOD AND APPARATUS

(71) Applicant: HUAWEI TECHNOLOGIES CO., LTD., Shenzhen (CN)

(72) Inventors: Lei Gao, Beijing (CN); Chao Quan, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/591,263

(22) Filed: Feb. 29, 2024

(65) Prior Publication Data

US 2024/0204935 A1 Jun. 20, 2024

Related U.S. Application Data

(63) Continuation of application No. PCT/CN2022/113681, filed on Aug. 19, 2022.

(30) Foreign Application Priority Data

Sep. 1, 2021 (CN) ......................... 202111022688.X

(51) Int. Cl.
*H04L 5/00* (2006.01)
*H04W 72/0446* (2023.01)
*H04W 72/0453* (2023.01)

(52) U.S. Cl.
CPC ....... *H04L 5/0012* (2013.01); *H04W 72/0446* (2013.01); *H04W 72/0453* (2013.01)

(58) Field of Classification Search
CPC .......... H04W 72/0453; H04W 72/0446; H04L 5/0092; H04L 5/0012; H04L 5/0044;

(Continued)

(56) References Cited

U.S. PATENT DOCUMENTS 10,548,123 B2 * 1/2020 Ouchi .................. H04W 72/30
2012/0307744 A1 * 12/2012 Charbit ................ H04W 72/12
370/329

(Continued)

FOREIGN PATENT DOCUMENTS

CN 110996265 A 4/2020
CN 112399600 A 2/2021

OTHER PUBLICATIONS

International Search Report and Written Opinion issued in PCT/CN2022/113681, dated Nov. 18, 2022, 10 pages.

(Continued)

*Primary Examiner* — Brian D Nguyen

(57) ABSTRACT

A communication method and a communication apparatus are disclosed. The method includes: A first node sends a first message on at least one broadcast frequency hopping channel, where the first message indicates a first resource on a first general frequency hopping channel; and sends a second message on the first resource, where the second message indicates a transmission opportunity group or a transmission opportunity group set. According to the method, the first node may communicate with another node (for example, a second node) without establishing a connection relationship. In addition, when the transmission opportunity group or the transmission opportunity group set includes two or more transmission opportunities, because the second node may learn of a resource of each transmission opportunity based on the second message, operations of receiving a message by the second node in all the transmission opportunities are independent of each other.

19 Claims, 10 Drawing Sheets

(58) Field of Classification Search
CPC ......... H04L 5/0087; H04L 5/14; H04B 1/713; Y02D 30/70
See application file for complete search history.

(56) References Cited

U.S. PATENT DOCUMENTS

| | | | | |
|---|---|---|---|---|
| 2015/0092710 | A1* | 4/2015 | Novlan | H04L 5/0053 370/329 |
| 2018/0249448 | A1* | 8/2018 | Yasukawa | H04W 74/0808 |
| 2019/0389477 | A1* | 12/2019 | Balakrishna | F02N 11/0811 |
| 2020/0275294 | A1* | 8/2020 | Sun | H04W 74/0808 |
| 2020/0336973 | A1* | 10/2020 | Niu | H04W 72/23 |
| 2021/0392618 | A1* | 12/2021 | Hedayat | H04W 72/30 |
| 2022/0015146 | A1* | 1/2022 | Rune | H04W 74/0816 |
| 2022/0030605 | A1* | 1/2022 | Hu | H04W 72/1268 |

OTHER PUBLICATIONS

Bluetooth Sig: "Core System Package Low Energy Controller vol. Specification of the Bluetooth System. Specification vol. 6 ", Covered Core Package Version: 5.0, Jun. 1, 2016 (Jun. 1, 2016), XP055750619, Retrieved from the Internet: URL: https://inst.eecs.berkeley.edu/~ee290c/spl8/note/BLE_Vol6.pdf.

Extended European Search Report issued in EP22863187.5, dated Nov. 20, 2024, 10 pages.

* cited by examiner

Transmission opportunity group

Transmission opportunity 1

Transmission opportunity 2

A first node sends a message

The first node sends a message

Time domain

Resource 1

Resource 2

COMMUNICATION METHOD AND APPARATUS

CROSS-REFERENCE TO RELATED APPLICATIONS

This application is a continuation of International Application No. PCT/CN2022/113681, filed on Aug. 19, 2022, which claims priority to Chinese Patent Application No. 202111022688.X, filed on Sep. 1, 2021. The disclosures of the aforementioned applications are hereby incorporated by reference in their entireties.

TECHNICAL FIELD

This application relates to the field of communication technologies, and in particular, to a communication method and apparatus.

BACKGROUND

Usually, before exchanging service data, devices need to first establish a stable communication connection relationship through signaling exchange, and then transmit the service data based on the communication connection relationship. However, in a scenario in which a service data transmission frequency is low, to save energy of the devices, the devices are disconnected during a service data transmission interval, and before service data transmission is performed next time, a connection is re-established between the devices to perform service data transmission. However, in a scenario in which a service data transmission frequency is low and a small amount of data is transmitted in a single time, if a connection is re-established each time before service transmission is performed, non-negligible additional power consumption is caused, and a transmission procedure is complex.

To further reduce power consumption of the devices and simplify the data transmission procedure, a procedure of establishing a communication connection relationship through signaling exchange may not be performed between the devices, but the devices directly perform service data transmission by using a unilaterally configured and/or pre-agreed resource and transmission manner. However, in conventional technology, the communication method has a technical problem of low reliability.

SUMMARY

Embodiments of this application provide a communication method and apparatus, to improve reliability of connectionless communication and implement bidirectional transmission of service data between nodes.

According to a first aspect, a communication method is provided, and includes: A first node sends a first message on at least one broadcast frequency hopping channel, where the first message indicates a first resource on a first general frequency hopping channel; and the first node sends a second message on the first resource, where the second message indicates a transmission opportunity group or a transmission opportunity group set, the transmission opportunity group set includes at least two transmission opportunity groups, the transmission opportunity group includes at least two transmission opportunities, and the transmission opportunity includes a resource used to carry a message from the first node.

In this embodiment, the first node sends the first message on the broadcast frequency hopping channel to indicate the first resource on the first general frequency hopping channel, and sends the second message on the first resource to indicate the transmission opportunity group or the transmission opportunity group set, so that connectionless transmission between the first node and another node (for example, a second node) can be implemented. In addition, because the second node may learn of a resource (for example, a time resource corresponding to each transmission opportunity) of each transmission opportunity based on the second message, operations of receiving a message by the second node in all the transmission opportunities are independent of each other. In this way, even if the second node fails to receive a message in a transmission opportunity, receiving of a message from the first node by the second node in another transmission opportunity is not affected. Therefore, based on this embodiment, reliability of connectionless transmission can be improved.

In a possible implementation, the second message may indicate the transmission opportunity group, and the second message carries one or more of the following information: start moment information of the transmission opportunity group; time length information of the transmission opportunity group; frequency hopping frequency information or frequency hopping channel information corresponding to the transmission opportunity group; and bandwidth information corresponding to the transmission opportunity group.

In this way, the second node may learn of a time domain location and/or a frequency domain location corresponding to the transmission opportunity group from the second message based on one or more of the foregoing information, to further improve communication reliability.

In a possible implementation, the second message may indicate the transmission opportunity group set, start moments of transmission opportunity groups in the transmission opportunity group set are distributed at an equal interval in time domain, and the second message carries one or more of the following information: start moment information of at least one transmission opportunity group in the transmission opportunity group set; time length information of at least one transmission opportunity group in the transmission opportunity group set; frequency hopping frequency information or frequency hopping channel information corresponding to at least one transmission opportunity group in the transmission opportunity group set; bandwidth information corresponding to at least one transmission opportunity group in the transmission opportunity group set; information about an interval between start moments of two adjacent transmission opportunity groups in the transmission opportunity group set in time domain; frequency hopping random seed information corresponding to at least one transmission opportunity group in the transmission opportunity group set; clock parameter information corresponding to at least one transmission opportunity group in the transmission opportunity group set; clock parameter information of the first resource; and information about a quantity of transmission opportunity groups included in the transmission opportunity group set.

In this way, the second node may learn of a time domain location and/or a frequency domain location corresponding to the transmission opportunity group set from the second message based on one or more of the foregoing information, to further improve communication reliability.

In a possible implementation, the second message further carries one or more of the following information: information about an interval between start moments of two adjacent transmission opportunities in the transmission opportunity group in time domain; and information about a quantity of transmission opportunities included in the transmission opportunity group.

In this way, the second node may determine a specific time domain location of each transmission opportunity in the transmission opportunity group based on one or more of the foregoing information, to further improve communication reliability.

In a possible implementation, the first node sends a third message in at least one transmission opportunity in the transmission opportunity group or the transmission opportunity group set.

In this way, the first node may send the third message to another node (for example, the second node) in a connectionless manner.

In a possible implementation, the third message is used to carry broadcast service data and/or broadcast signaling, and the broadcast service data and/or the broadcast signaling belong/belongs to a first broadcast set; and the third message further carries one or more of the following information: a broadcast set identifier that indicates the first broadcast set; an update identifier that indicates an update of information in the first broadcast set; and a data packet identifier that indicates a first data packet that is carried in the third message and corresponds to the first broadcast set.

In this way, after receiving the third message, a node (for example, the second node) may avoid receiving unnecessary information based on the foregoing information, to reduce energy consumption. For example, if the broadcast set indicated in the third message is irrelevant to the second node, the second node may not receive a data packet in the third message or discard a correctly received data packet. For example, if the data packet identifier is the same as a data packet identifier corresponding to a data packet carried in a previously received message, the second node may not receive a data packet in the third message or discard a correctly received data packet, or perform operations such as retransmission and combination. For example, if the update identifier indicates that the information in the first broadcast set is not updated, the second node may not receive a data packet in the third message or discard a correctly received data packet.

In a possible implementation, broadcast service data and/or broadcast signaling carried in different messages transmitted in a same transmission opportunity group belong/belongs to a same broadcast set.

In this way, after a node (for example, the second node) receives a broadcast message, if it is determined that a broadcast set indicated in the message is irrelevant to the node, another broadcast message in a current transmission group may not be received, to reduce energy consumption.

In a possible implementation, the second message further indicates an identifier of the second node. In this way, the first node may send a unicast message in the transmission opportunity included in the transmission opportunity group or the transmission opportunity group set indicated in the second message, and transmit a data packet to the specified second node.

Further, the transmission opportunity further includes a resource used to carry a message from the second node. In this way, bidirectional service transmission between the first node and the second node can be implemented.

In a possible implementation, the second message further indicates an identifier of the second node and an identifier of a third node. In this way, the first node may send a multicast message in the transmission opportunity included in the transmission opportunity group or the transmission opportunity group set indicated in the second message, and transmit a data packet to a specified group of nodes (that is, the second node and the third node).

Further, the transmission opportunity further includes a resource used to carry a message from the second node and a resource used to carry a message from the third node. In this way, bidirectional service transmission between the first node and the second node and bidirectional service transmission between the first node and the third node can be implemented.

Further, the second message further indicates a sequence of the resource used to carry the message from the second node and the resource used to carry the message from the third node that are in the transmission opportunity. In this way, a sequence of sending messages by the second node and the third node may be specified, and the second node and the third node are indicated to sequentially send messages by using different resources in the transmission opportunity, to further improve communication reliability.

According to a second aspect, a communication method is provided, and includes: A second node receives a first message on at least one broadcast frequency hopping channel, where the first message indicates a first resource on a first general frequency hopping channel; and the second node receives a second message on the first resource, where the second message indicates a transmission opportunity group or a transmission opportunity group set, the transmission opportunity group set includes at least two transmission opportunity groups, the transmission opportunity group includes at least two transmission opportunities, and the transmission opportunity includes a resource used to carry a message from a first node.

In a possible implementation, the second message indicates the transmission opportunity group, and the second message carries one or more of the following information: start moment information of the transmission opportunity group; time length information of the transmission opportunity group; frequency hopping frequency information or frequency hopping channel information corresponding to the transmission opportunity group; and bandwidth information corresponding to the transmission opportunity group.

In a possible implementation, the second message indicates the transmission opportunity group set, start moments of transmission opportunity groups in the transmission opportunity group set are distributed at an equal interval in time domain, and the second message carries one or more of the following information: start moment information of at least one transmission opportunity group in the transmission opportunity group set; time length information of at least one transmission opportunity group in the transmission opportunity group set; frequency hopping frequency information or frequency hopping channel information corresponding to at least one transmission opportunity group in the transmission opportunity group set; bandwidth information corresponding to at least one transmission opportunity group in the transmission opportunity group set; information about an interval between start moments of two adjacent transmission opportunity groups in the transmission opportunity group set in time domain; frequency hopping random seed information corresponding to at least one transmission opportunity group in the transmission opportunity group set; clock parameter information corresponding to at least one transmission opportunity group in the transmission opportunity group set; clock parameter information of the first resource; and information about a quantity of transmission opportunity groups included in the transmission opportunity group set.

In a possible implementation, the second message further carries one or more of the following information: information about an interval between start moments of two adjacent transmission opportunities in the transmission opportunity group in time domain; and information about a quantity of transmission opportunities included in the transmission opportunity group.

In a possible implementation, the second node may further receive a third message in at least one transmission opportunity in the transmission opportunity group or the transmission opportunity group set.

In a possible implementation, the third message is used to carry broadcast service data and/or broadcast signaling, and the broadcast service data and/or the broadcast signaling belong/belongs to a first broadcast set; and the third message further carries one or more of the following information: a broadcast set identifier that indicates the first broadcast set; an update identifier that indicates an update of information in the first broadcast set; and a data packet identifier that indicates a first data packet that is carried in the third message and corresponds to the first broadcast set.

In a possible implementation, broadcast service data and/or broadcast signaling carried in different messages transmitted in a same transmission opportunity group belong/belongs to a same broadcast set.

In a possible implementation, the transmission opportunity further includes a resource used to carry a message from the second node, and the second message further indicates an identifier of the second node.

In a possible implementation, the transmission opportunity further includes a resource used to carry a message from a third node; and the second message further indicates an identifier of the third node and a sequence of the resource used to carry the message from the second node and the resource used to carry the message from the third node that are in the transmission opportunity.

In a possible implementation, the second node sends a fourth message in at least one transmission opportunity in the transmission opportunity group or the transmission opportunity group set.

For beneficial effects of the foregoing implementations, refer to the beneficial effects of the corresponding implementations of the first aspect.

In a possible implementation, if in any transmission opportunity group, the second node does not receive a message from the first node within a preset duration, the second node determines that the any transmission opportunity group is unavailable. The preset duration may be a time length of N consecutive transmission opportunities or a time length of L timeslots. This is not limited in this application. Herein, N and L are positive integers.

In this way, unnecessary power consumption waste caused by continuous monitoring of the transmission opportunity group by the second node when the transmission opportunity group is unavailable due to a reason such as continuous interference or active abandonment of transmission by the first node can be avoided.

According to a third aspect, a communication apparatus is provided, and may be, for example, a device disposed on a first node or a chip in a device disposed on a first node. The apparatus includes a module or a unit configured to perform the method in any one of the first aspect or the possible implementations of the first aspect.

For example, the apparatus may include:

a transceiver unit, configured to send a first message on at least one broadcast frequency hopping channel, where the first message indicates a first resource on a first general frequency hopping channel, where the transceiver unit is further configured to send a second message on the first resource, where the second message indicates a transmission opportunity group or a transmission opportunity group set, the transmission opportunity group set includes at least two transmission opportunity groups, the transmission opportunity group includes at least two transmission opportunities, and the transmission opportunity includes a resource used to carry a message from a node on which the communication apparatus is located.

In a possible implementation, the communication apparatus may further include:

a processing unit, configured to generate the first message and the second message.

In a possible implementation, the second message indicates the transmission opportunity group, and the second message carries one or more of the following information:

start moment information of the transmission opportunity group;

time length information of the transmission opportunity group;

frequency hopping frequency information or frequency hopping channel information corresponding to the transmission opportunity group; and bandwidth information corresponding to the transmission opportunity group.

In a possible implementation, the second message indicates the transmission opportunity group set, start moments of transmission opportunity groups in the transmission opportunity group set are distributed at an equal interval in time domain, and the second message carries one or more of the following information:

start moment information of at least one transmission opportunity group in the transmission opportunity group set;

time length information of at least one transmission opportunity group in the transmission opportunity group set;

frequency hopping frequency information or frequency hopping channel information corresponding to at least one transmission opportunity group in the transmission opportunity group set;

bandwidth information corresponding to at least one transmission opportunity group in the transmission opportunity group set;

information about an interval between start moments of two adjacent transmission opportunity groups in the transmission opportunity group set in time domain;

frequency hopping random seed information corresponding to at least one transmission opportunity group in the transmission opportunity group set;

clock parameter information corresponding to at least one transmission opportunity group in the transmission opportunity group set;

clock parameter information of the first resource; and information about a quantity of transmission opportunity groups included in the transmission opportunity group set.

In a possible implementation, the second message further carries one or more of the following information:

information about an interval between start moments of two adjacent transmission opportunities in the transmission opportunity group in time domain; and information about a quantity of transmission opportunities included in the transmission opportunity group.

In a possible implementation, the transceiver unit is further configured to send a third message in at least one transmission opportunity in the transmission opportunity group or the transmission opportunity group set.

In a possible implementation, the third message is used to carry broadcast service data and/or broadcast signaling, and the broadcast service data and/or the broadcast signaling belong/belongs to a first broadcast set; and the third message further carries one or more of the following information:

a broadcast set identifier that indicates the first broadcast set;

an update identifier that indicates an update of information in the first broadcast set; and a data packet identifier that indicates a first data packet that is carried in the third message and corresponds to the first broadcast set.

In a possible implementation, the transmission opportunity further includes a resource used to carry a message from a second node, and the second message further indicates an identifier of the second node.

In a possible implementation, the transmission opportunity further includes a resource used to carry a message from a third node; and the second message further indicates an identifier of the third node and a sequence of the resource used to carry the message from the second node and the resource used to carry the message from the third node that are in the transmission opportunity.

According to a fourth aspect, a communication apparatus is provided, and may be, for example, a device disposed on a second node or a chip in a device disposed on a second node. The communication apparatus includes a module or a unit configured to perform the method in any one of the second aspect or the possible implementations of the second aspect.

For example, the communication apparatus may include:

a transceiver unit, configured to: receive a first message on at least one broadcast frequency hopping channel, where the first message indicates a first resource on a first general frequency hopping channel; and receive a second message on the first resource, where the second message indicates a transmission opportunity group or a transmission opportunity group set, the transmission opportunity group set includes at least two transmission opportunity groups, the transmission opportunity group includes at least two transmission opportunities, and the transmission opportunity includes a resource used to carry a message from a first node.

In a possible implementation, the second message indicates the transmission opportunity group, and the second message carries one or more of the following information:

start moment information of the transmission opportunity group;

time length information of the transmission opportunity group;

frequency hopping frequency information or frequency hopping channel information corresponding to the transmission opportunity group; and bandwidth information corresponding to the transmission opportunity group.

In a possible implementation, the second message indicates the transmission opportunity group set, start moments of transmission opportunity groups in the transmission opportunity group set are distributed at an equal interval in time domain, and the second message carries one or more of the following information:

start moment information of at least one transmission opportunity group in the transmission opportunity group set;

time length information of at least one transmission opportunity group in the transmission opportunity group set;

frequency hopping frequency information or frequency hopping channel information corresponding to at least one transmission opportunity group in the transmission opportunity group set;

bandwidth information corresponding to at least one transmission opportunity group in the transmission opportunity group set;

information about an interval between start moments of two adjacent transmission opportunity groups in the transmission opportunity group set in time domain;

frequency hopping random seed information corresponding to at least one transmission opportunity group in the transmission opportunity group set;

clock parameter information corresponding to at least one transmission opportunity group in the transmission opportunity group set;

clock parameter information of the first resource; and information about a quantity of transmission opportunity groups included in the transmission opportunity group set.

In a possible implementation, the second message further carries one or more of the following information:

information about an interval between start moments of two adjacent transmission opportunities in the transmission opportunity group in time domain; and information about a quantity of transmission opportunities included in the transmission opportunity group.

In a possible implementation, the transceiver unit is further configured to receive a third message in at least one transmission opportunity in the transmission opportunity group or the transmission opportunity group set.

In a possible implementation, the third message is used to carry broadcast service data and/or broadcast signaling, and the broadcast service data and/or the broadcast signaling belong/belongs to a first broadcast set; and the third message further carries one or more of the following information:

a broadcast set identifier that indicates the first broadcast set;

an update identifier that indicates an update of information in the first broadcast set; and a data packet identifier that indicates a first data packet that is carried in the third message and corresponds to the first broadcast set.

In a possible implementation, the transmission opportunity further includes a resource used to carry a message from a node on which the communication apparatus is located, and the second message further indicates an identifier of the node on which the communication apparatus is located.

In a possible implementation, the transmission opportunity further includes a resource used to carry a message from a third node; and the second message further indicates an identifier of the third node and a sequence of the resource used to carry the message from the node on which the communication apparatus is located and the resource used to carry the message from the third node that are in the transmission opportunity.

In a possible implementation, the transceiver unit is further configured to:

send a fourth message in at least one transmission opportunity in the transmission opportunity group or the transmission opportunity group set.

In a possible implementation, the communication apparatus further includes a processing unit, configured to:

if in any transmission opportunity group, the transceiver unit does not receive a message from the first node within a preset duration, determine that the any transmission opportunity group is unavailable.

In a possible implementation, the preset duration is a time length of N consecutive transmission opportunities or a time length of L timeslots, where N and L are positive integers.

According to a fifth aspect, a communication apparatus is provided, and includes at least one processor and an interface circuit. The interface circuit is configured to provide information input and/or information output for the at least one processor. The at least one processor implements the method in any one of the first aspect or the possible implementations of the first aspect or the method in any one of the second aspect or the possible implementations of the second aspect through a logic circuit or by executing code instructions.

Optionally, the communication apparatus may further include a memory, configured to: store instructions to be executed by the processor, store input data required by the processor to run instructions, or store data generated after the processor runs instructions.

According to a sixth aspect, a computer-readable storage medium is provided. The storage medium stores a computer program or instructions. When the computer program or the instructions are executed by a communication apparatus, the method in any one of the first aspect or the possible implementations of the first aspect or the method in any one of the second aspect or the possible implementations of the second aspect is implemented.

According to a seventh aspect, a computer program product is provided, and includes instructions. When the instructions are run on a computer, the method in any one of the first aspect or the possible implementations of the first aspect or the method in any one of the second aspect or the possible implementations of the second aspect is performed.

According to an eighth aspect, a terminal is provided. The terminal includes the communication apparatus in any one of the third aspect or the possible implementations of the third aspect, or the terminal includes the communication apparatus in any one of the fourth aspect or the possible implementations of the fourth aspect.

DESCRIPTION OF EMBODIMENTS

Embodiments of this application may be applied to various wireless communication scenarios, for example, scenarios such as in-vehicle communication, smart home communication, intelligent transportation communication, robot communication, uncrewed aerial vehicle communication, intelligent manufacturing, intelligent wearable, and an intelligent terminal.

With continuous development of global communication technologies, wireless communication technologies have surpassed wired communication technologies in terms of a development speed and an application, and present a booming development trend. Intelligent devices such as an intelligent transportation device, a smart home device, and a robot are gradually entering daily life of people. In a wireless communication scenario in which the intelligent device is located, a plurality of nodes that are located in a specific area or range and that support a same wireless communication technology may form a communication system. A wireless communication technology based on which communication between communication nodes is performed may be a short-range communication technology such as Bluetooth, a wireless fidelity (Wi-Fi) system, or a general in-vehicle short-range communication technology, or any short-range communication technology that may appear in the future. This is not specifically limited in this application.

Figure 1:
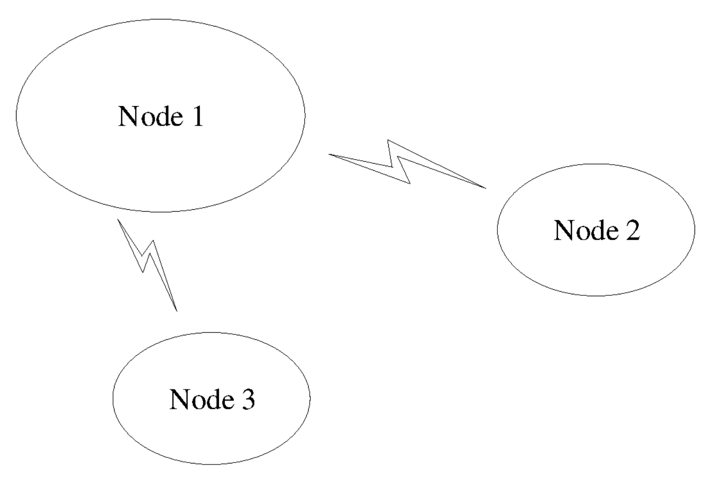
FIG. 1 is a schematic diagram of an example communication system according to an embodiment of this application.

For example, FIG. 1 is a schematic diagram of an example communication system according to an embodiment of this application. The communication system includes at least two communication nodes (which may be briefly referred to as nodes). Both a distance between a node 1 and a node 2 and a distance between the node 1 and a node 3 are less than a preset distance, and all of the node 1, the node 2, and the node 3 support a Bluetooth technology.

It should be understood that in an actual case, as the node moves or a communication capability of the node changes, the node included in the communication system may change. For example, when a communication range between the node 3 and the node 1 exceeds the preset distance, or a Bluetooth function of the node 3 is disabled, the node 3 cannot communicate with the node 1. Therefore, it may be considered that the node 3 exits the communication system.

Figure 2:
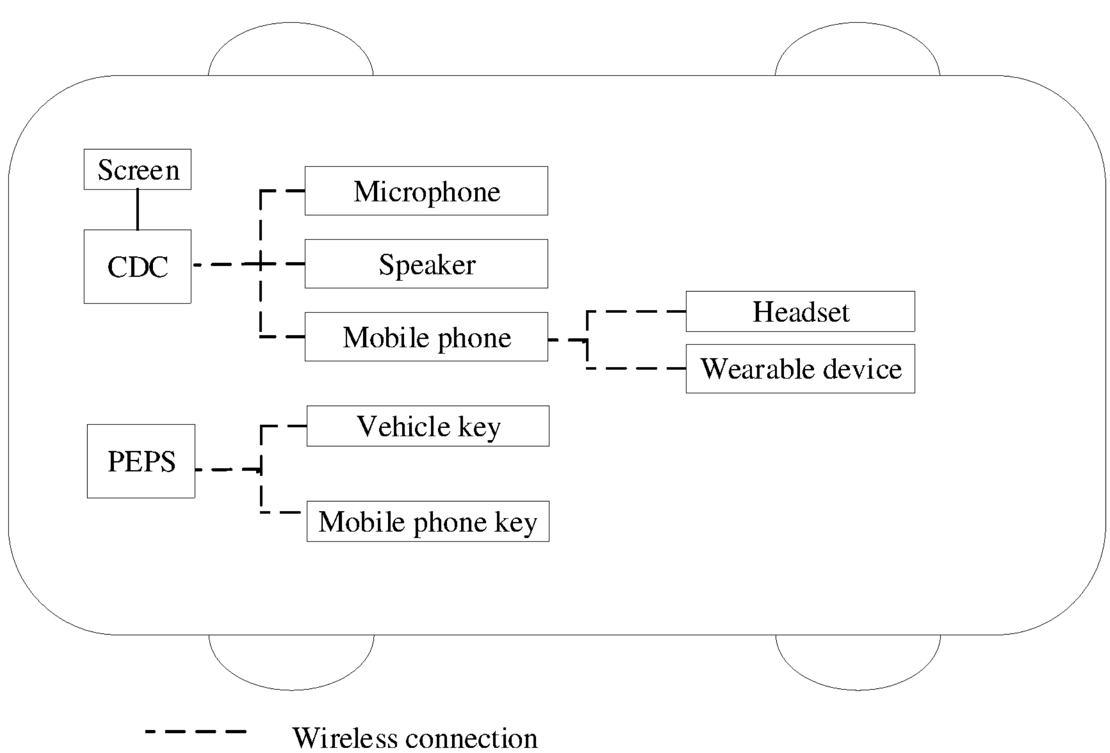
FIG. 2 is a schematic diagram of an example communication scenario according to an embodiment of this application.

In a specific example, FIG. 2 is a schematic diagram of an example in-vehicle communication scenario. There may be a plurality of wireless communication systems in the scenario. For example, a cockpit domain controller (CDC) may form a communication system with a microphone, a speaker, a mobile phone, and the like, the mobile phone may form a communication system with a headset, a wearable device, and the like, and a passive entry passive start (PEPS) system may form a communication system with a mobile phone key, a vehicle key, and the like. It may be learned from FIG. 2 that one node may be simultaneously located in a plurality of different communication systems.

It should be understood that the network architecture and the service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems.

It should be noted that during specific implementation, if a component in a device performs wireless communication with another component in the device, the device may correspond to a plurality of nodes; if a device performs wireless communication with another device, the device may correspond to one node; or if a system including a plurality of devices performs wireless communication with another device or another system, one node may simultaneously correspond to a plurality of devices. A correspondence between a node and a device is not specifically limited in this application. For ease of description, in this specification, an example in which one node corresponds to one device is mainly used for description. Therefore, unless otherwise specified, “node” and “device” in this specification may be interchanged.

In a wireless communication scenario, service data is usually exchanged between devices in a connection-based transmission manner. That is, the devices first establish a connection through signaling exchange, and establish a stable communication connection relationship (including exchanging a device capability, exchanging a provided/required service, exchanging authentication information, configuring a transmission resource matching the device capability, configuring an encryption parameter, configuring another connection-related parameter, and the like), and then transmit the service data based on the communication connection relationship. During a service data transmission interval, the connection between the devices may be maintained (for example, when there is no service data transmission, the devices periodically exchange signaling to maintain the connection). However, in some service scenarios, for example, a scenario in which a service data transmission frequency is low, to reduce energy consumption of the devices, the devices may be disconnected during the service data transmission interval, and before service data transmission is performed next time, a connection is re-established between the devices to perform service data transmission.

However, in a service scenario in which a transmission frequency is low and a small amount of data is transmitted in each time, if a connection is re-established each time before service transmission is performed, non-negligible additional power consumption is caused, and a procedure is complex. In such a scenario, a connectionless transmission manner may be used to further reduce power consumption. In the connectionless transmission manner, a signaling exchange procedure for connection establishment is not performed between the devices, and the devices perform service data transmission by using a unilaterally configured and/or pre-agreed resource and transmission manner. In addition, in some service scenarios, to simplify a transmission procedure and device implementation, the connectionless transmission manner may also be used.

The following describes two types of connectionless transmission by using a Bluetooth low energy (BLE) communication technology as an example.

The BLE works on a frequency band ranging from 2.400 GHz to 2.480 GHz. The frequency band range is equally divided into 40 frequency bands, which correspond to 40 channels. A center frequency of a first channel starts from 2402 MHz, and center frequencies increase at an interval of 2 MHz. The 40 channels included in the BLE are specifically classified into three broadcast channels and 37 data channels. A device may send a broadcast message by using the broadcast channel, to discover and be connected to another device. After a connection relationship is established, the device may send service data by using the data channel. A message on the data channel can be understood only by two connected devices, and a message on the broadcast channel may be broadcast to a plurality of devices or sent only to a specific device.

Manner 1: Connectionless Transmission Based on an Extended Broadcast Event

It may be learned from the foregoing descriptions that in a BLE scenario, a message on a broadcast channel may be received and understood by all nodes. However, because there are only three broadcast channels, to avoid a conflict with transmission of another device on the broadcast channel, a message may be sent on the broadcast channel to indicate a data channel, and a broadcast message is sent on the data channel to carry service data. Such an event of extending the data channel to a broadcast channel is an “extended broadcast event”.

Figure 3A:
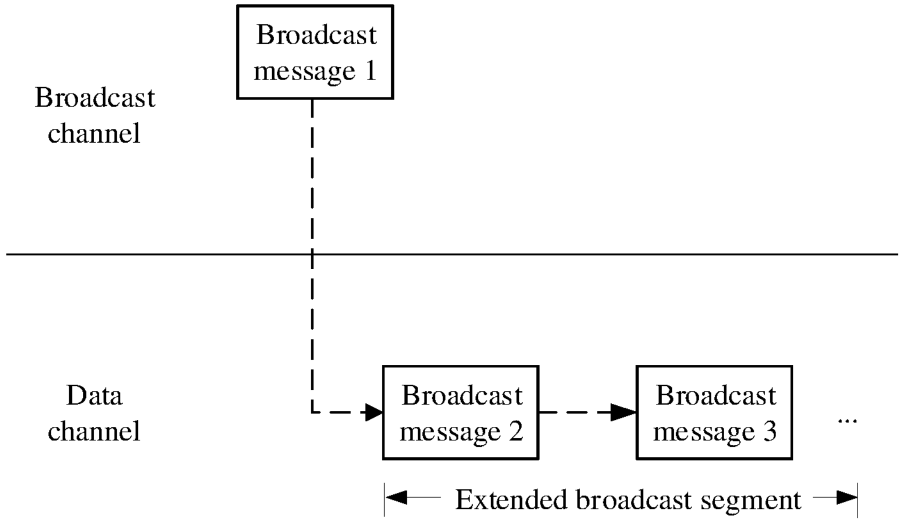
FIG. 3A and FIG. 3B each are a schematic diagram of connectionless transmission based on an extended broadcast segment.

For example, with reference to FIG. 3A, a first node may send a broadcast message 1 on a broadcast channel specified in the BLE, and indicate a resource (including a time domain resource and a frequency domain resource) of a broadcast message 2 in the broadcast message 1 (the broadcast message 2 is transmitted on a data channel), and a second node may receive the broadcast message 2 on the corresponding data channel based on an indication of the sender in the broadcast message 1. Further, the first node may further continue to indicate a resource of a broadcast message 3 in the broadcast message 2 (the broadcast message 3 is transmitted on a data channel, and the data channels corresponding to the broadcast message 2 and the broadcast message 3 may be the same or different), and the second node may receive the broadcast message 3 on the corresponding data channel based on an indication of the sender in the broadcast message 2, and so on.

Figure 3B:
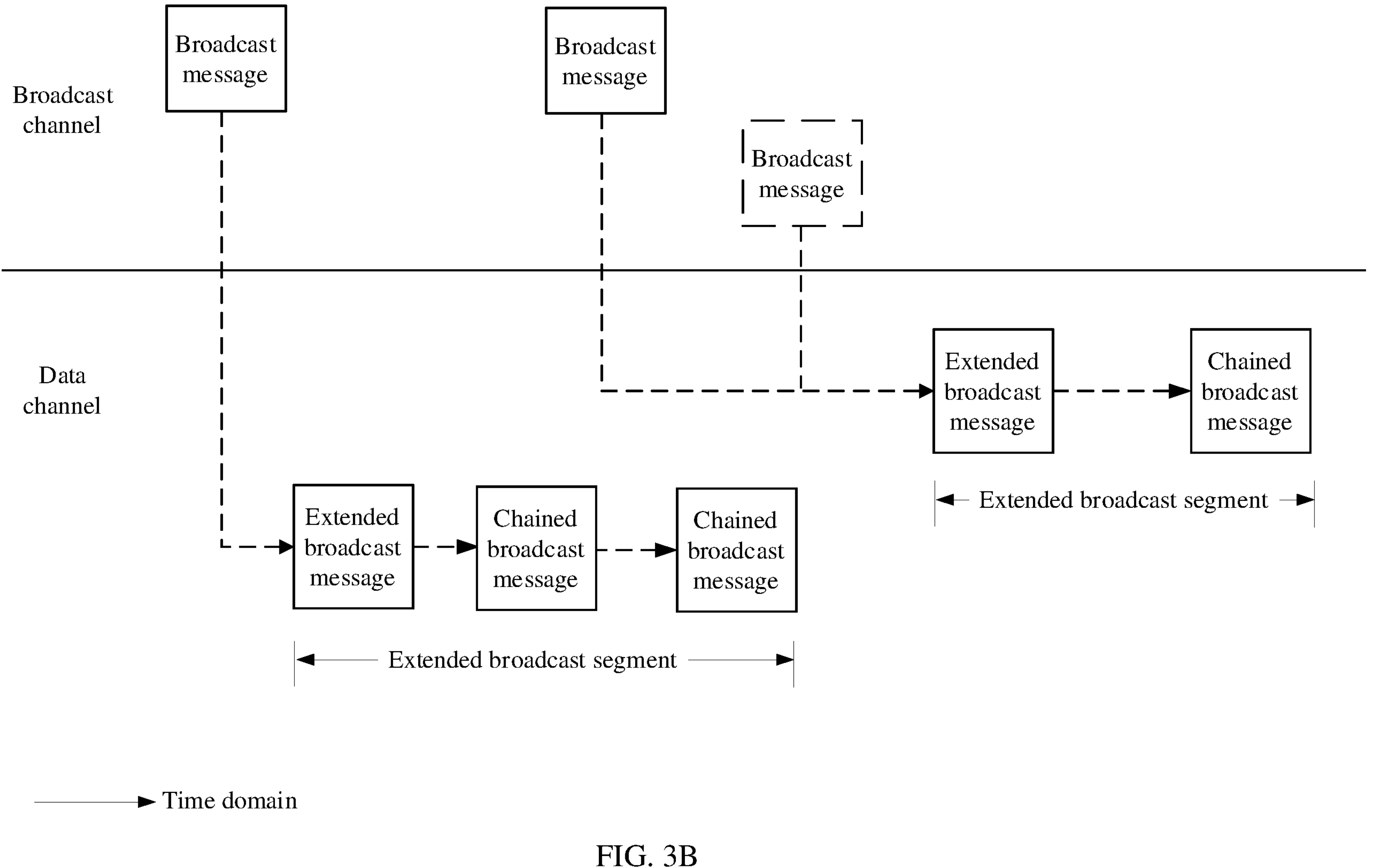

With reference to FIG. 3B, to distinguish between the broadcast message sent on the data channel and the broadcast message sent on the broadcast channel, in this specification, the broadcast message (for example, the broadcast message 1 in FIG. 3A) sent on the broadcast channel may be referred to as a broadcast message, a first broadcast message (for example, the broadcast message 2 in FIG. 3A) sent on the data channel is referred to as an extended broadcast message, and another broadcast message (for example, the broadcast message 3 in FIG. 3A) sent on the data broadcast channel is referred to as a chained broadcast message. An extended broadcast message and a chained broadcast message included in an extended event are referred to as an extended broadcast segment.

During specific implementation, each extended broadcast segment may not include a chained broadcast message, or may include one or more chained broadcast messages. The extended broadcast message may indicate a resource of a first chained broadcast message, and any chained broadcast message may indicate a resource of a next chained broadcast message.

The first node may send a broadcast message on one broadcast channel to indicate an extended broadcast message, or may simultaneously send broadcast messages on a plurality of broadcast channels to indicate a same extended broadcast message. A broadcast message identified by using a dashed box in FIG. 3B is optional.

Manner 2: Connectionless Transmission Based on a Periodic Broadcast Event

The periodic broadcast event is a broadcast event that periodically occurs.

Figure 3C:
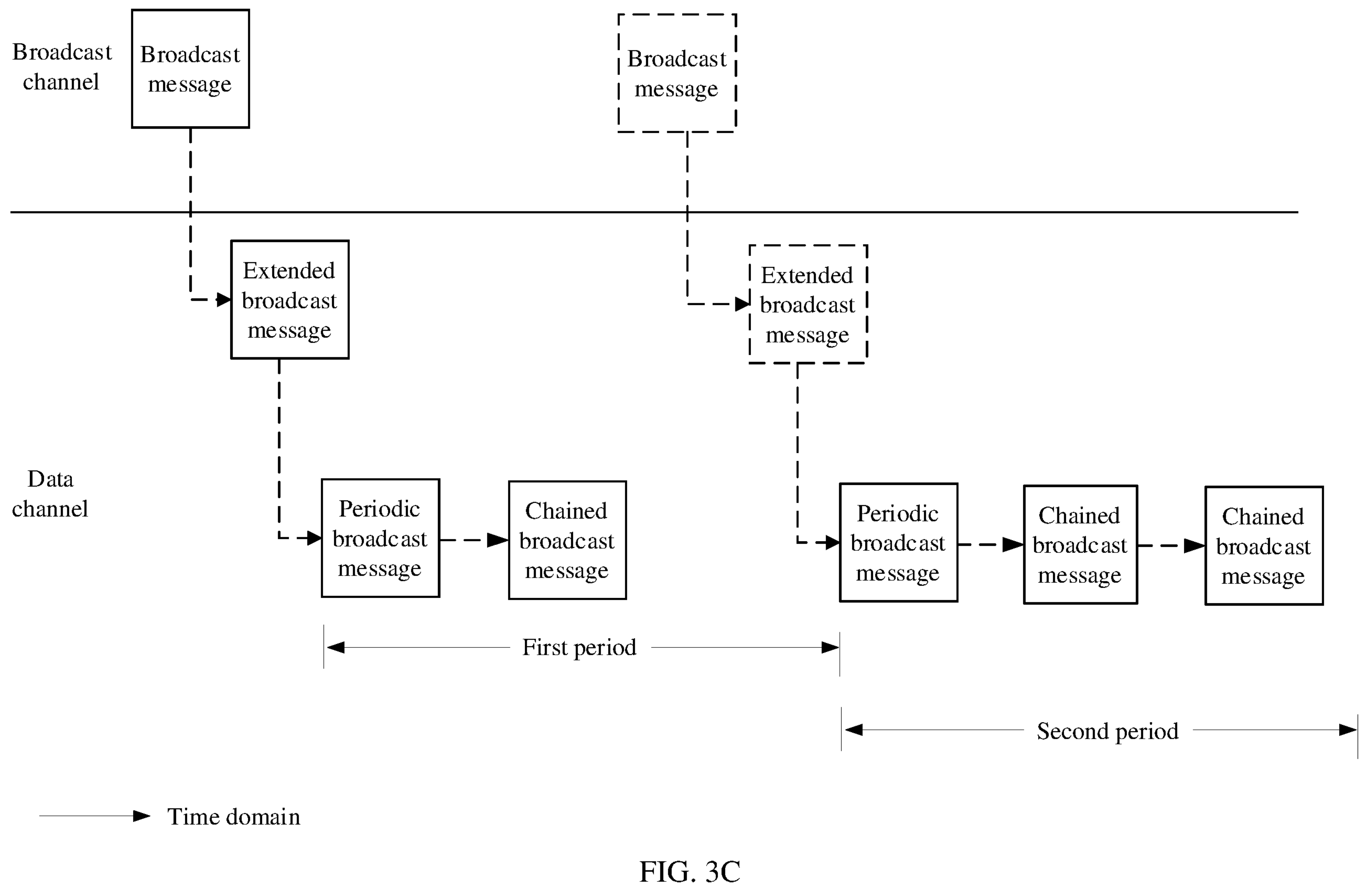
FIG. 3C is a schematic diagram of connectionless transmission based on a periodic broadcast event.

FIG. 3C is a schematic diagram of connectionless transmission based on a periodic broadcast event. A first node sends a broadcast message on a broadcast channel. The broadcast message indicates a resource of an extended broadcast message, the extended broadcast message indicates a resource of a periodic broadcast message, the periodic broadcast message indicates a resource of a first chained broadcast message, the first chained broadcast message indicates a resource of a second chained broadcast message, and so on. A start moment of each period is a start moment of the periodic broadcast message. Each period may not include a chained broadcast message, or may include one or more chained broadcast messages.

During specific implementation, one extended broadcast message may indicate a periodic broadcast message in only one period, or may indicate extended broadcast messages in a plurality of periods. This is not limited in this application. In FIG. 3C, a broadcast message and an extended broadcast message that are in a period other than a first period and that are identified by using a dashed box are optional.

It may be learned from the foregoing descriptions that regardless of the connectionless transmission based on an extended broadcast event or the connectionless transmission based on a periodic broadcast event, in each extended broadcast segment or each period, a message implements a chained indication, that is, a current message indicates a resource of a next message. Therefore, if any message fails to be received in the extended broadcast segment or the period, a message transmission failure may be caused in the entire extended broadcast segment or period. Therefore, a problem of low communication reliability exists. In addition, in the connectionless transmission, only the first node (that is, a broadcaster) sends a message, and another node (for example, the second node) is not supported in sending a message to the first node. Therefore, reliability of transmission of the first node cannot be ensured by using feedback of the second node, the second node cannot be supported in transmitting service data to the first node, and bidirectional service data exchange between the second node and the first node cannot be supported. Therefore, a technical problem of poor communication flexibility exists.

In view of this, the technical solutions in embodiments of this application are provided, to improve reliability of connectionless transmission between nodes and implement bidirectional service transmission between the nodes.

To make the objectives, technical solutions, and advantages of embodiments of this application clearer, the following further describes the technical solutions in embodiments of this application in detail with reference to the accompanying drawings.

Figures 4, 5:
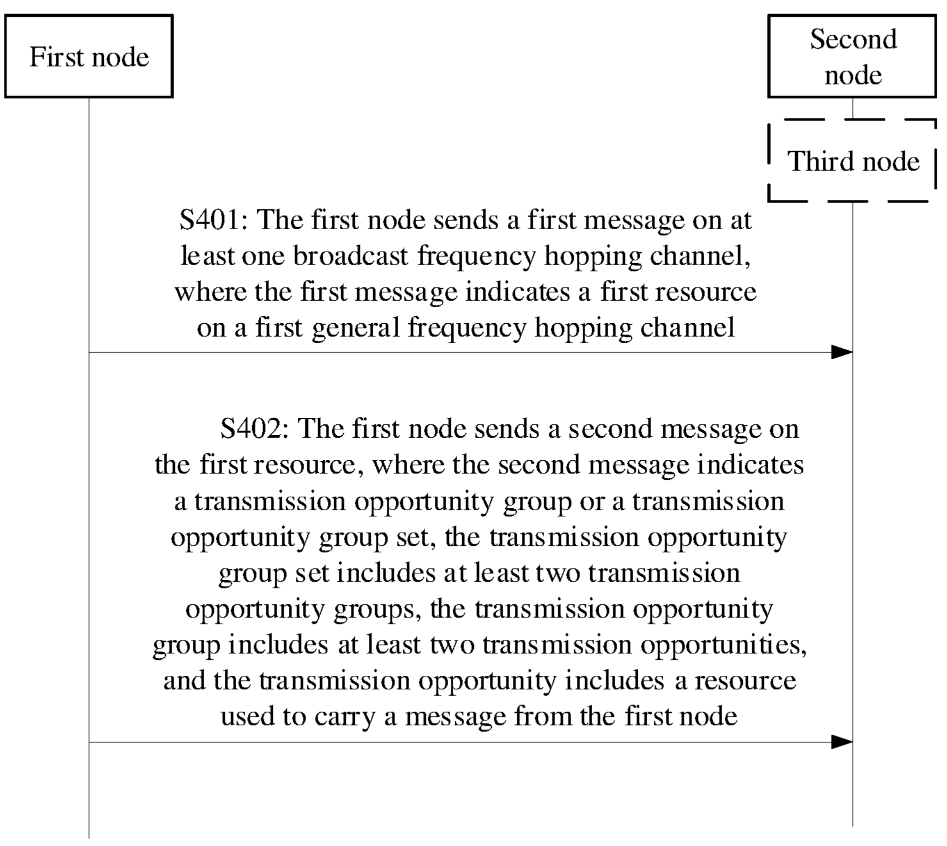
FIG. 4 is a flowchart of an example communication method according to an embodiment of this application.
FIG. 5 is a flowchart of an example communication method according to an embodiment of this application.

FIG. 4 is a flowchart of an example communication method according to an embodiment of this application. An example in which the method is applied to the communication system shown in FIG. 1 is used for description. The method includes the following steps.

S401: A first node sends a first message on at least one broadcast frequency hopping channel. Correspondingly, a second node receives the first message on the at least one broadcast frequency hopping channel. The first message indicates a first resource on a first general frequency hopping channel.

The first node may be any node in the communication system shown in FIG. 1, for example, a node 1. In this case, the second node may be any node that is communication-reachable by the first node, for example, a node 2.

It should be understood that if there are a plurality of nodes that are communication-reachable by the first node, for example, in addition to the second node, there is a third node (for example, a node 3), the third node may also receive the first message on the at least one broadcast frequency hopping channel. It should be understood that in FIG. 4, the third node is identified by using a dashed box, which indicates that the third node is optional. This depends on specific implementation. Implementations of receiving the first message on the at least one broadcast frequency hopping channel by nodes are similar. Therefore, an example in which the second node receives the first message on the at least one broadcast frequency hopping channel is mainly used in this specification.

In a communication system, a frequency band used by a node for communication may be divided into a plurality of frequency hopping channels. Each frequency hopping channel corresponds to one center frequency. Therefore, the frequency hopping channel and a frequency hopping frequency may be interchanged.

Communication may be performed between nodes (for example, the first node and the second node) based on a frequency hopping technology, that is, a frequency hopping channel is used each time the node sends and/or receives a message. The frequency hopping channel is not changed during sending and/or receiving of the message. When the node sends and/or receives a plurality of messages, the used frequency hopping channel may vary with time.

In a possible implementation, frequency hopping channels are classified into two types: a general frequency hopping channel and a broadcast frequency hopping channel based on whether the frequency hopping channel can be used to carry a broadcast message (also referred to as a connectionless transmission message). For example, a frequency hopping channel that can be used to send a message other than the broadcast message may be referred to as a general frequency hopping channel, and a frequency hopping channel that cannot be used to send a message other than the broadcast message (that is, is specifically used to send the broadcast message) may be referred to as a broadcast frequency hopping channel.

In an example of a BLE frequency band, the broadcast frequency hopping channel may be a broadcast channel (namely, a broadcast channel 37, a broadcast channel 38, and a broadcast channel 39) specified in BLE. A center frequency corresponding to the broadcast channel 37 is 2.402 GHz, a frequency corresponding to the BLE broadcast channel 38 is 2.426 GHZ, and a frequency corresponding to the BLE broadcast channel 39 is 2.480 GHz. Correspondingly, the first message may be a broadcast message on each of the broadcast channel 37, the broadcast channel 38, and the broadcast channel 39, for example, each of the broadcast messages in FIG. 3A to FIG. 3C. The general frequency hopping channel may be a data channel other than the broadcast channel 37, the broadcast channel 38, and the broadcast channel 39 in the foregoing 40 channels.

The first resource on the first general frequency hopping channel includes a first time domain resource and a first frequency domain resource. The first frequency domain resource may be all subcarrier resources on the first general frequency hopping channel, or may be some subcarrier resources on the first general frequency hopping channel. The first time domain resource is a period of time for which the first node occupies the first general frequency hopping channel. The period of time may be in a unit of second(s), millisecond (ms), frame, subframe, timeslot, or the like. This is not limited in this application.

For example, a wireless transmission technology is BLE. If in a first time period, the first node sends the first message on the broadcast channel 37, where the first message indicates a subcarrier resource on a data channel 1, and indicates a second time period (the second time period is after the first time period), it indicates that after the second time period arrives, the first node may send a message on the data channel 1.

S402: The first node sends a second message on the first resource. Correspondingly, the second node receives the second message on the first resource.

It should be understood that if nodes communication-reachable by the first node include another node, for example, the third node, in addition to the second node, the third node may also receive the second message on the first resource. Implementations of receiving the second message on the first resource by nodes are similar. Therefore, an example in which the second node receives the second message on the first resource is mainly used in this specification.

The first resource is a resource on the first general frequency hopping channel. Therefore, the second message is a message sent through the first general frequency hopping channel. For example, if a BLE scenario is used, a message type of the second message may be a message type of an extended broadcast message shown in FIG. 3A to FIG. 3C (that is, a message on a BLE data channel), but content indicated in the second message may be different from that indicated in the extended broadcast message in FIG. 3A to FIG. 3C.

Specifically, the second message indicates a transmission opportunity group or a transmission opportunity group set. The transmission opportunity group set includes at least two transmission opportunity groups, the transmission opportunity group includes at least two transmission opportunities (TXOP), and the transmission opportunity includes a resource used to carry a message from the first node.

In this embodiment, a predefined or configured continuous time resource used for a specific transmission purpose or a specific communication link is referred to as a transmission opportunity group. One transmission opportunity group includes at least one transmission opportunity (TXOP), and one transmission opportunity includes a resource for transmitting one or more messages.

Each transmission opportunity includes at least a resource used by the first node to send a message, that is, each transmission opportunity includes at least a resource for carrying a message from the first node. Optionally, each transmission opportunity may further include a resource used by the first node to receive a message, or each transmission opportunity includes at least a resource for carrying a message from a node other than the first node. It should be understood that in this specification, unless otherwise specified, a resource usually includes a time domain resource and a frequency domain resource.

For example, FIG. 5 is a schematic diagram of an example transmission opportunity group. In the transmission opportunity group, two transmission opportunities are used as an example, and one resource used by the first node to send a message is configured in each transmission opportunity. It should be understood that FIG. 5 is merely an example but is not a specific limitation.

After the second node receives the second message, the second node may learn of the transmission opportunity group or the transmission opportunity group set based on the second message.

It should be understood that when a time corresponding to a transmission opportunity in the transmission opportunity group or the transmission opportunity group set indicated in the second message arrives, the first node may choose to send a message, or may not send a message. This depends on specific implementation. If the first node sends a message when the time corresponding to the transmission opportunity in the transmission opportunity group or the transmission opportunity group set indicated in the second message arrives, for example, the first node sends a third message in at least one transmission opportunity in the transmission opportunity group or the transmission opportunity group set, the second node may receive the third message from the first node in the at least one transmission opportunity. The third message may carry service data sent by the first node to the second node.

It may be learned from the foregoing descriptions that the first node sends the first message on the broadcast frequency hopping channel to indicate the first resource on the first general frequency hopping channel, and sends the second message on the first resource to indicate the transmission opportunity group or the transmission opportunity group set, so that connectionless transmission between the first node and the second node can be implemented. When the transmission opportunity group or the transmission opportunity group set includes two or more transmission opportunities, because the second node may learn of a resource (for example, a time resource corresponding to each transmission opportunity) of each transmission opportunity based on the second message, operations of receiving a message by the second node in all the transmission opportunities are independent of each other. In this way, even if the second node fails to receive a message in a transmission opportunity, receiving of a message from the first node by the second node in another transmission opportunity is not affected. Therefore, based on this embodiment, reliability of connectionless transmission can be improved.

The following separately provides descriptions for cases in which the second message indicates the transmission opportunity group and the second message indicates the transmission opportunity group set.

Manner 1: The Second Message Indicates the Transmission Opportunity Group.

In an example embodiment, the second message carries at least time domain information and frequency domain information corresponding to the transmission opportunity group. For example, the second message carries one or more of the following information:

(1) Start Moment Information of the Transmission Opportunity Group

The information is information about a start moment of the transmission opportunity group. The start moment of the transmission opportunity group is a start moment of a first transmission opportunity in the transmission opportunity group.

Figure 6:
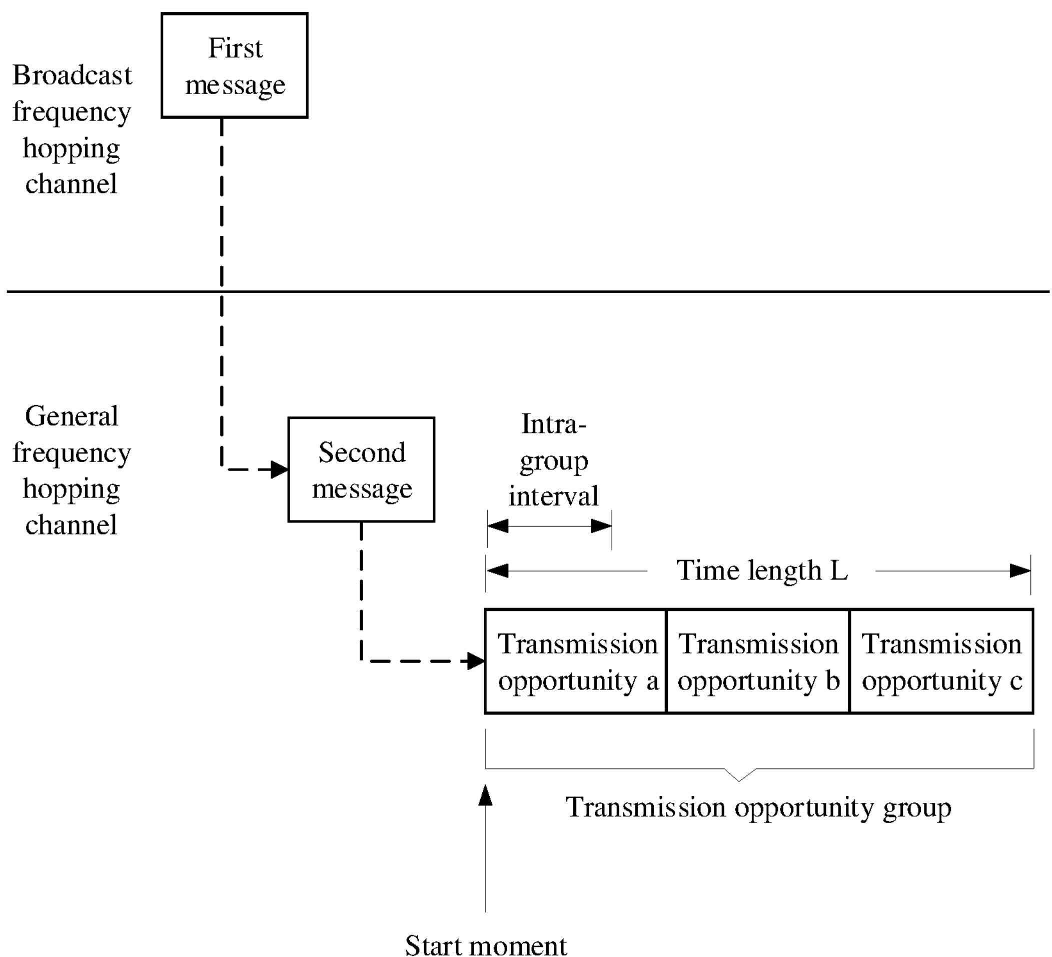
FIG. 6 is a schematic diagram of a transmission opportunity group.

For example, FIG. 6 is a schematic diagram of an example transmission opportunity group. For example, a quantity of transmission opportunities in the transmission opportunity group is 3, and transmission opportunities a, b, and c are specifically included. In this case, a start moment of the transmission opportunity group is a start moment of a first transmission opportunity, namely, the transmission opportunity a, in the transmission opportunity group. It should be understood that FIG. 6 is merely an example, and an actual quantity of transmission opportunities in the transmission opportunity group is not limited to 3.

During specific implementation, the information about the start moment may be the start moment of the first transmission opportunity in the transmission opportunity group, for example, a timeslot number, a frame number, or a subframe number corresponding to the start moment. The information about the start moment may alternatively be other information indicating the start moment, for example, an offset relative to a start moment of the second message or an end moment of the second message. The offset may be indicated by using a quantity of timeslots, frames, subframes, or the like, or a time length such as microseconds or milliseconds, or in another manner. This is not limited in this application.

(2) Time Length Information of the Transmission Opportunity Group

The information is information about a time length from the start moment of the first transmission opportunity in the transmission opportunity group to an end moment of a last transmission opportunity in the transmission opportunity group. For example, in FIG. 6, a time length of the transmission opportunity group is a time length from the start moment of the transmission opportunity a to an end moment of the transmission opportunity c.

Similarly, during specific implementation, the information may be the time length from the start moment of the first transmission opportunity in the transmission opportunity group to the end moment of the last transmission opportunity in the transmission opportunity group, or may be other information indicating the time length. This is not limited in this application.

(3) Frequency Hopping Frequency Information or Frequency Hopping Channel Information Corresponding to the Transmission Opportunity Group The information is information about a frequency hopping frequency or information about a frequency hopping channel corresponding to each transmission opportunity in the transmission opportunity group.

In an example embodiment, if frequency hopping frequency information or frequency hopping channel information corresponding to all the transmission opportunities in the transmission opportunity group is the same (that is, the first node does not perform frequency hopping between different transmission opportunities in a same transmission opportunity group), the second message may indicate only one piece of frequency hopping frequency information or frequency hopping channel information.

In another example embodiment, if different transmission opportunities in the transmission opportunity group correspond to different frequency hopping frequency information or frequency hopping channel information (that is, the first node performs frequency hopping between different transmission opportunities in a same transmission opportunity group), the second message may separately indicate frequency hopping frequency information or frequency hopping channel information corresponding to all the transmission opportunities.

Similarly, the frequency hopping frequency information or the frequency hopping channel information corresponding to the transmission opportunity group may be a frequency hopping frequency or a frequency hopping channel corresponding to the transmission opportunity group, for example, a data channel 0 or a center frequency 2.404 GHz, or may be other information indicating the frequency hopping frequency or the frequency hopping channel, for example, an index of the center frequency or an index of the frequency hopping channel. This is not limited in this application.

(4) Bandwidth Information Corresponding to the Transmission Opportunity Group

The information is information about a width of a frequency band on which each transmission opportunity in the transmission opportunity group is located.

In an example embodiment, if bandwidth information corresponding to all the transmission opportunities in the transmission opportunity group is the same, the second message may indicate only one piece of bandwidth information.

In another example embodiment, if different transmission opportunities in the transmission opportunity group correspond to different bandwidth information, the second message may separately indicate bandwidth information corresponding to all the transmission opportunities.

Similarly, the bandwidth information corresponding to the transmission opportunity group may be a bandwidth corresponding to the transmission opportunity group, for example, 2 MHz, or may be other information indicating the bandwidth. This is not limited in this application.

After receiving the second message, the second node may learn of a time domain location and/or a frequency domain location corresponding to the transmission opportunity group based on one or more of the foregoing information.

Further, to clearly know a specific time domain location of each transmission opportunity in the transmission opportunity group, the second message may further indicate information about an interval between start moments of two adjacent transmission opportunities in time domain. For example, the second message further carries one or more of the following information:

(5) Information about an Interval Between Start Moments of Two Adjacent Transmission Opportunities in the Transmission Opportunity Group in Time Domain The information is the information about the interval between the start moments of the two adjacent transmission opportunities in the transmission opportunity group in time domain. For example, an intra-group interval identified in FIG. 6 is an interval between start moments of the two adjacent transmission opportunities a and b in time domain.

There may be a plurality of intra-group intervals in one transmission opportunity group, and values of different intra-group intervals may be the same or may be different. This is not limited in this application. If values of all intra-group intervals in one transmission opportunity group are the same, the second message needs to indicate only one piece of interval information. If different intra-group intervals in one transmission opportunity group are different, the second message needs to indicate a plurality of pieces of interval information.

Similarly, the information that is about the interval between the start moments of the two adjacent transmission opportunities in time domain and that is carried in the second message may be the interval between the start moments of the two adjacent transmission opportunities in time domain, that is, a time difference, or may be other information indicating the interval (the time difference). This is not limited in this application.

(6) Information about a Quantity of Transmission Opportunities Included in the Transmission Opportunity Group When the second message indicates the information about the quantity of transmission opportunities included in the transmission opportunity group and the time length information of the transmission opportunity group, the information about the interval between the start moments of the two adjacent transmission opportunities in the transmission opportunity group in time domain may be calculated based on the information about the quantity and the time length information. For example, if all intra-group intervals in the transmission opportunity group are the same, the time length of the transmission opportunity group is L, and the quantity of transmission opportunities included in the transmission opportunity group is M, an interval between start moments of any two adjacent transmission opportunities in the transmission opportunity group in time domain is L/M.

Similarly, the information about the quantity of transmission opportunities included in the transmission opportunity group may be the quantity of transmission opportunities included in the transmission opportunity group, or may be other information indicating the quantity. This is not limited in this application.

Based on the manner 1, the second node may learn of information about each transmission opportunity in the transmission opportunity group from the second message. When the transmission opportunity group includes two or more transmission opportunities, even if the second node fails to receive a message in a transmission opportunity, receiving of a message in another transmission opportunity is not affected. Therefore, reliability of connectionless transmission based on an extended broadcast event can be improved.

Manner 2: The Second Message Indicates the Transmission Opportunity Group Set.

Figure 7:
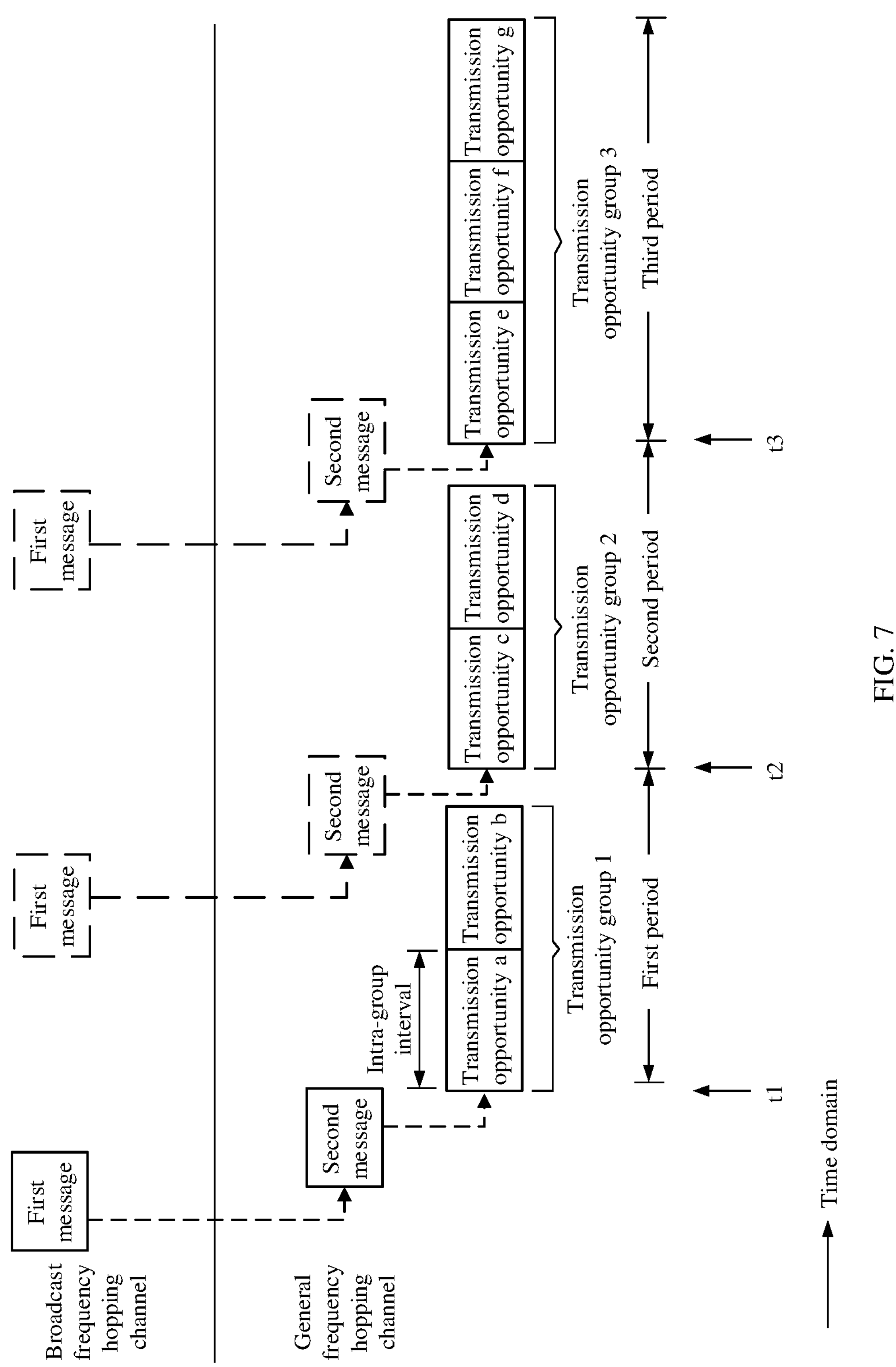
FIG. 7 is a schematic diagram of a transmission opportunity group set.

In an example embodiment, start moments of transmission opportunity groups in the transmission opportunity group set are distributed at an equal interval in time domain (that is, periodically distributed in time domain). For example, FIG. 7 is a schematic diagram of an example transmission opportunity group set. It should be understood that in FIG. 7, an example in which the transmission opportunity group set includes three transmission opportunity groups is used. Actually, there may be fewer or more transmission opportunity groups. This is not limited in this application. In FIG. 7, start moments (that is, t1, t2, and t3) of transmission opportunity groups 1, 2, and 3 are distributed at an equal interval in time domain.

The second message may carry one or more of the following information:

(1) Start Moment Information of at Least One Transmission Opportunity Group in the Transmission Opportunity Group Set The start moment information of the at least one transmission opportunity group in the transmission opportunity group set may be information about a start moment of a first transmission opportunity group in the at least one transmission opportunity group, or may be information about a start moment of each transmission opportunity group in the at least one transmission opportunity group. This is not limited in this application. For example, in FIG. 7, the start moment of the transmission opportunity group 1 is t1, the start moment of the transmission opportunity group is t2, and the start moment of the transmission opportunity group is t3. In this case, a second message corresponding to a first period may carry information only about t1, or may carry information about t1, t2, and t3.

Similarly, the start moment information of the at least one transmission opportunity group may be a start moment of the at least one transmission opportunity group, or may be other information indicating the start moment of the at least one transmission opportunity group. This is not limited in this application.

In addition, for a definition of the start moment, refer to the foregoing descriptions.

(2) Time Length Information of at Least One Transmission Opportunity Group in the Transmission Opportunity Group Set The second message may carry information about a time length of only one transmission opportunity group, or may simultaneously carry information about time lengths of a plurality of transmission opportunity groups. This is not limited in this application.

Time lengths of different transmission opportunity groups in the transmission opportunity group set may be the same or may be different. This is not limited in this application. For example, in FIG. 7, a time length of the transmission opportunity group 1 is the same as a time length of the transmission opportunity group 2, and a time length of the transmission opportunity group 3 is different from the time length of the transmission opportunity group 1.

Similarly, the time length information of the at least one transmission opportunity group may be a time length of the at least one transmission opportunity group, or may be other information indicating the time length of the at least one transmission opportunity group. This is not limited in this application.

In addition, for a definition of the time length, refer to the foregoing descriptions.

(3) Frequency Hopping Frequency Information or Frequency Hopping Channel Information Corresponding to at Least One Transmission Opportunity Group in the Transmission Opportunity Group Set The second message may carry frequency hopping frequency information or frequency hopping channel information corresponding to only one transmission opportunity group, or may simultaneously carry frequency hopping frequency information or frequency hopping channel information corresponding to a plurality of transmission opportunity groups. This is not limited in this application.

In an example embodiment, transmission opportunities in a same transmission group correspond to a same frequency (that is, the first node does not perform frequency hopping in a same transmission opportunity group), and different transmission opportunity groups may correspond to different frequencies (that is, the first node may perform frequency hopping between transmission opportunity groups). For example, in FIG. 7, a frequency corresponding to the transmission opportunity group 1 may be f1, a frequency corresponding to the transmission opportunity group 2 may be f2, and a frequency corresponding to the transmission opportunity group 3 may be f3, where f1, f2, and f3 are different frequencies.

Similarly, the frequency hopping frequency information or the frequency hopping channel information corresponding to the at least one transmission opportunity group in the transmission opportunity group set may be a frequency hopping frequency or a frequency hopping channel corresponding to the at least one transmission opportunity group in the transmission opportunity group set, or may be other information indicating the frequency hopping frequency or the frequency hopping channel corresponding to the at least one transmission opportunity group in the transmission opportunity group set. This is not limited in this application.

In addition, for a definition of the frequency hopping frequency or the frequency hopping channel, refer to the foregoing descriptions.

(4) Bandwidth Information Corresponding to at Least One Transmission Opportunity Group in the Transmission Opportunity Group Set The second message may carry bandwidth information corresponding to only one transmission opportunity group, or may simultaneously carry bandwidth information corresponding to a plurality of transmission opportunity groups. This is not limited in this application.

Similarly, bandwidths corresponding to different transmission opportunity groups may be the same or may be different.

Similarly, the bandwidth information corresponding to the at least one transmission opportunity group in the transmission opportunity group set may be a bandwidth corresponding to the at least one transmission opportunity group in the transmission opportunity group set, or may be other information indicating the bandwidth corresponding to the at least one transmission opportunity group in the transmission opportunity group set. This is not limited in this application.

In addition, for a definition of the bandwidth, refer to the foregoing descriptions.

(5) Information about an Interval Between Start Moments of Two Adjacent Transmission Opportunity Groups in the Transmission Opportunity Group Set in Time Domain For example, in FIG. 7, an interval between the start moments of the transmission opportunity groups 1 and 2 in time domain is t2−t1, and an interval between the start moments of the transmission opportunity groups 2 and 3 in time domain is t3−t2. The start moments of the transmission opportunity groups in the transmission opportunity group set are distributed at an equal interval in time domain. Therefore, t2−t1=t3−t2, and the second message needs to carry only one piece of information about an interval between start moments of two adjacent transmission opportunity groups in time domain, for example, information about Δt, where Δt=t2−t1=t3−t2.

Similarly, the information about the interval between the start moments of the two adjacent transmission opportunity groups in the transmission opportunity group set in time domain may be the interval (for example, Δt) between the start moments of the two adjacent transmission opportunity groups in the transmission opportunity group set in time domain, or may be other information (for example, t2 and t1) indicating a time corresponding to at least one transmission opportunity group in the transmission opportunity group set. This is not limited in this application.

In addition, for a definition of the interval between the start moments in time domain, refer to the foregoing descriptions.

(6) Frequency Hopping Random Seed Information Corresponding to at Least One Transmission Opportunity Group in the Transmission Opportunity Group Set In this embodiment, each node may determine, by using a predefined frequency hopping algorithm based on a frequency hopping random seed and a clock parameter corresponding to a resource for sending and/or receiving a message, a frequency hopping channel for sending and/or receiving the message. The frequency hopping random seed is used for frequency hopping randomization between different nodes or different links, to avoid a problem that a same frequency hopping channel is frequently selected because frequency hopping is performed in a same manner when the different nodes send messages or messages are transmitted over the different links, and consequently severe mutual interference is caused.

Similarly, the second message may carry frequency hopping random seed information corresponding to only one transmission opportunity group, or may simultaneously carry frequency hopping random seed information corresponding to a plurality of transmission opportunity groups. This is not limited in this application.

Similarly, the frequency hopping random seed information corresponding to the at least one transmission opportunity group in the transmission opportunity group set may be a frequency hopping random seed corresponding to the at least one transmission opportunity group in the transmission opportunity group set, or may be other information indicating the frequency hopping random seed corresponding to the at least one transmission opportunity group in the transmission opportunity group set. This is not limited in this application.

(7) Clock Parameter Information Corresponding to at Least One Transmission Opportunity Group in the Transmission Opportunity Group Set In this embodiment, when sending and/or receiving a message, each node determines a to-be-used frequency hopping channel based on a clock parameter, so that when a plurality of messages are sent and/or received, the to-be-used frequency hopping channel varies with time.

The clock parameter is usually a predefined or configured clock parameter corresponding to a resource used to send and/or receive a message. For example, a clock parameter corresponding to a start moment of a transmission opportunity group used to send and/or receive the message is configured or predefined, and a clock parameter corresponding to a start moment of a transmission opportunity used to send and/or receive the message is configured or predefined. The clock parameter may be a value corresponding to a time in a unit of microsecond, millisecond, or the like, or may be a number of a time domain resource unit such as a timeslot, a subframe, or a frame. This is not limited in this application.

Similarly, the second message may carry clock parameter information corresponding to only one transmission opportunity group, or may simultaneously carry clock parameter information corresponding to a plurality of transmission opportunity groups. This is not limited in this application.

(8) Clock Parameter Information of the First Resource

If the second node knows a clock parameter of the first resource and an offset of a transmission opportunity group relative to the first resource, a clock parameter of the transmission opportunity group may be determined. Therefore, the second message may carry the clock parameter of the first resource to indirectly indicate the clock parameter of the transmission opportunity group. For example, the second message may carry a timeslot number corresponding to a resource start moment to indirectly indicate a timeslot number of the transmission opportunity group.

Optionally, the second message may further carry an offset of the transmission opportunity group relative to the first resource; or the offset of the transmission opportunity group relative to the first resource is a predefined or preconfigured fixed value.

Similarly, the clock parameter information of the first resource may be the clock parameter of the first resource, or may be other information indicating the clock parameter of the first resource. This is not limited in this application.

(9) Information about a Quantity of Transmission Opportunity Groups Included in the Transmission Opportunity Group Set For example, in the scenario shown in FIG. 7, a quantity of transmission opportunity groups included in the transmission opportunity group set is 3.

Similarly, the information about the quantity of transmission opportunity groups included in the transmission opportunity group set may be the quantity of transmission opportunity groups included in the transmission opportunity group set, or may be other information indicating the quantity of transmission opportunity groups included in the transmission opportunity group set. This is not limited in this application.

After receiving the second message, the second node may learn of a time domain location and/or a frequency domain location of each transmission opportunity group in the transmission opportunity group set based on one or more of the foregoing information.

Further, to clearly know a specific time domain location of each transmission opportunity in the transmission opportunity group, the second message may further indicate information about an interval between start moments of two adjacent transmission opportunities in time domain, for example, information about an interval between start moments of two adjacent transmission opportunities in the transmission opportunity group in time domain, or information about a quantity of transmission opportunities included in the transmission opportunity group. For specific explanations, refer to the foregoing descriptions.

Based on the manner 2, the second node may learn of information about each transmission opportunity in each transmission opportunity group in the transmission opportunity group set from the second message. When the transmission opportunity group includes two or more transmission opportunities, even if the second node fails to receive a message in a transmission opportunity, receiving of a message in another transmission opportunity is not affected. Therefore, reliability of connectionless transmission based on a periodic broadcast event can be improved.

In this embodiment, the first node may send a broadcast message, a multicast message, or a unicast message in the transmission opportunity included in the transmission opportunity group or the transmission opportunity group set indicated in the second message. This is not limited in this application.

Case 1: The first node sends the broadcast message in the transmission opportunity included in the transmission opportunity group or the transmission opportunity group set indicated in the second message.

For example, the first node sends a third message in at least one transmission opportunity in the transmission opportunity group or the transmission opportunity group set. The third message is used to carry broadcast service data and/or broadcast signaling. All nodes other than the first node in the system may receive the third message in the at least one transmission opportunity in the transmission opportunity group or the transmission opportunity group set. In this way, transmission of the broadcast message is implemented.

In this embodiment, a plurality of pieces of broadcast data and/or broadcast signaling may respectively belong to different broadcast sets based on different services, nodes, or node types.

In an example embodiment, the broadcast service data and/or the broadcast signaling carried in the third message belong/belongs to a first broadcast set, and the third message may further carry a broadcast set identifier that indicates the first broadcast set. In this way, each node that receives the third message may determine, based on the identifier, that the broadcast data and/or the broadcast signaling carried in the third message belong/belongs to the first broadcast set.

A size of a maximum data packet that can be carried in a broadcast message is limited. Therefore, if broadcast data or broadcast signaling is large, the broadcast data or broadcast signaling is split into a plurality of different data packets during transmission. Certainly, if broadcast data or broadcast signaling is small enough, the broadcast data or broadcast signaling may not be split and is used as a data packet. One broadcast message may carry one of the foregoing data packets, and data packets carried in different broadcast messages may be the same or different.

In an example embodiment, different data packets correspond to different data packet identifiers, and the third message may further carry a data packet identifier. In this case, each node that receives the third message may determine, based on the data packet identifier, whether a data packet carried in the third message is the same as a data packet carried in another previously received message, and then may not perform receiving or discard a correctly received data packet, perform retransmission and combination, or perform another operation, to reduce energy consumption and improve transmission reliability.

In a possible implementation, the data packet identifier is meaningful only in one transmission group. That is, data packets carried in two messages with a same data packet identifier in a same transmission group are the same, but data packets carried in messages with a same data packet identifier in different transmission groups may be the same or may be different.

A broadcast set indicated in a broadcast message is a broadcast set to which broadcast data or broadcast signaling corresponding to a data packet carried in the broadcast message belongs.

In a possible implementation, broadcast data and/or broadcast signaling in only one broadcast set are/is transmitted in one transmission opportunity group. After a node receives a broadcast message, if it is determined that a broadcast set indicated in the message is irrelevant to the node, another broadcast message in a current transmission group may not be received, to reduce energy consumption.

Broadcast data and/or broadcast signaling in a broadcast set may be periodically or irregularly updated. In this case, in a period of time, the broadcast data and/or the broadcast signaling in the broadcast set may remain unchanged. In this period of time, the broadcast data and/or the broadcast signaling may be repeatedly sent by using a broadcast message. After the broadcast data and/or the broadcast signaling in the broadcast set are/is updated, new broadcast data and/or broadcast signaling are/is sent in a broadcast message for sending the broadcast data in the broadcast set and/or a broadcast message (which is below briefly referred to as a broadcast message used for the broadcast set) for sending the broadcast signaling. After determining that the broadcast data and/or the broadcast signaling in the broadcast set are/is completely received, a node that receives the broadcast message may no longer receive the broadcast data and/or the broadcast signaling in the broadcast set before there is an update, to avoid receiving unnecessary repeated information, so as to reduce energy consumption.

In an example embodiment, the broadcast message may carry an update identifier that indicates whether the broadcast data and/or the broadcast signaling in the broadcast set are/is updated. The node that receives the broadcast message may determine, by using the identifier, whether the broadcast data and/or the broadcast signaling in the broadcast set are/is updated. For example, the third message may carry an update identifier to indicate whether information in the first broadcast set is updated.

During specific implementation, the update identifier may be indicated in a bit flipping manner. For example, before an update is made, identifiers of all broadcast messages used for the broadcast set are "0", and broadcast data and/or broadcast signaling before the update are/is transmitted; after an update is made, the identifiers of all the broadcast messages used for the broadcast set are "1", and updated broadcast data and/or broadcast signaling are/is transmitted; after another update is made, the identifiers of all the broadcast messages used for the broadcast set are "0", and broadcast data and/or broadcast signaling obtained after the another update is made are/is transmitted; and so on. Whether the broadcast data and/or the broadcast signaling are/is updated is indicated in the bit flipping manner, and is not directly indicated in a specific message (for example, a first updated broadcast message used for the broadcast set), so that when the receiving node does not receive the specific message, the receiving node can still accurately determine whether the broadcast data and/or the broadcast signaling are/is updated, to further improve communication reliability.

Optionally, one or more of the broadcast set identifier, the data packet identifier, the update identifier, and the like may be carried in physical layer control information of the third message.

Case 2: The first node sends the unicast message in the transmission opportunity included in the transmission opportunity group or the transmission opportunity group set indicated in the second message.

For example, the second message further indicates an identifier of the second node. The first node sends a third message in at least one transmission opportunity in the transmission opportunity group or the transmission opportunity group set. After receiving the second message, the second node may determine, based on the identifier of the second node carried in the second message, that the transmission opportunity group or the transmission opportunity group set indicated in the second message corresponds to the second node. In this case, when the at least one transmission opportunity in the transmission opportunity group or the transmission opportunity group set indicated in the second message arrives, the second node receives the third message from the first node. After receiving the second message, another node, for example, the third node, determines, based on the identifier of the second node carried in the second message, that the transmission opportunity group or the transmission opportunity group set indicated in the second message does not correspond to the third node, and therefore does not monitor, when the at least one transmission opportunity in the transmission opportunity group or the transmission opportunity group set indicated in the second message arrives, the third message sent by the first node. In this way, transmission of the unicast message is implemented.

In an example embodiment, the transmission opportunity included in the transmission opportunity group or the transmission opportunity group set indicated in the second message further includes a resource used to carry a message from the second node. In this case, the first node and the second node may perform bidirectional service interaction. For example, the second node sends a fourth message in at least one transmission opportunity in the transmission opportunity group or the transmission opportunity group set indicated in the second message.

In this embodiment, a sequence of sending messages by the first node and the second node in a transmission opportunity is not limited, and a quantity of resources used to carry the message from the first node and a quantity of resources used to carry the message from the second node are not limited.

In an example embodiment, transmission patterns of different transmission opportunities in the same transmission opportunity group are the same. That transmission patterns of two different transmission opportunities are the same means that a same quantity of resources used to transmit a message is configured in the two transmission opportunities (that is, maximum quantities of messages that can be transmitted in the two transmission opportunities are the same);

and nodes (that is, the first node and the second node) that transmit messages by using the two transmission opportunities are the same. For any one of these nodes, in the two transmission opportunities, rankings of configured resources that can be used by the node to send/receive a message are the same. For example, in the two transmission opportunities, a resource appearing first is a configured resource used by the first node to send a message, and a resource appearing second is a configured resource used by the second node to send a message.

Figure 8:
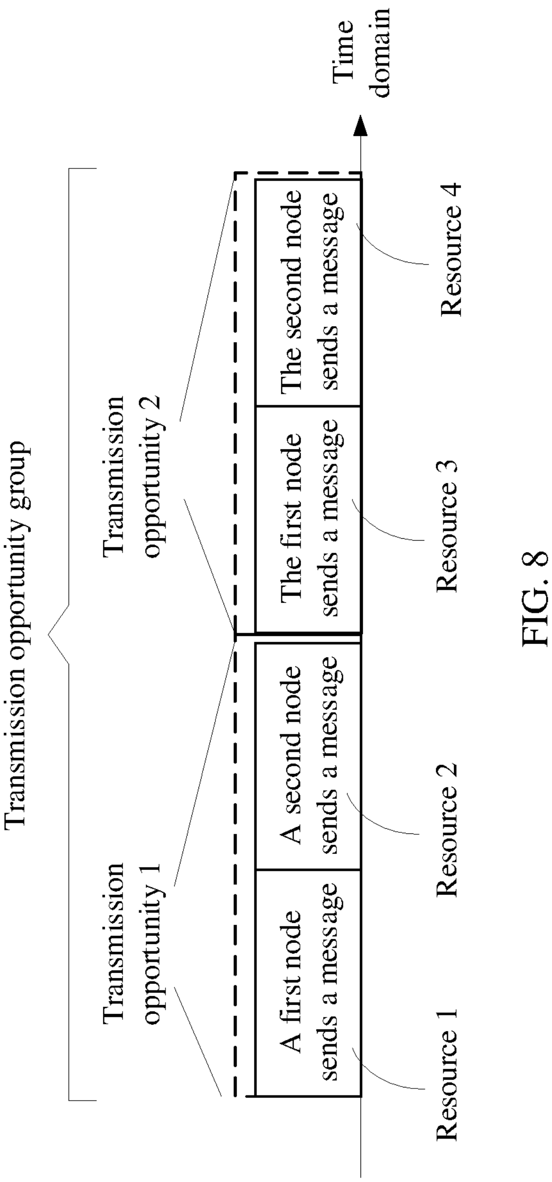
FIG. 8 is a schematic diagram of a transmission opportunity group.

For example, FIG. 8 is a schematic diagram of an example transmission opportunity group. In the transmission opportunity group, two transmission opportunities are used as an example, and a quantity of configured resources used to transmit a message in each transmission opportunity is 2. In transmission opportunities 1 and 2, a resource appearing first is a configured resource used by the first node to send a message, and a resource appearing second is a configured resource used by the second node to send a message.

It should be noted that transmission patterns of different transmission opportunity groups may be the same or may be different. This is not limited in this application.

Case 3: The first node sends the multicast message in the transmission opportunity included in the transmission opportunity group or the transmission opportunity group set indicated in the second message.

For example, the second message further indicates identifiers of the second node and the third node. The first node sends a third message in at least one transmission opportunity in the transmission opportunity group or the transmission opportunity group set. After receiving the second message, the second node may determine, based on the identifier of the second node carried in the second message, that the transmission opportunity group or the transmission opportunity group set indicated in the second message corresponds to the second node. In this case, when the at least one transmission opportunity in the transmission opportunity group or the transmission opportunity group set indicated in the second message arrives, the second node receives the third message from the first node. After receiving the second message, the third node determines, based on the identifier of the third node carried in the second message, that the transmission opportunity group or the transmission opportunity group set indicated in the second message corresponds to the third node. In this case, when the at least one transmission opportunity in the transmission opportunity group or the transmission opportunity group set indicated in the second message arrives, the third node also receives the third message from the first node. In this way, transmission of the multicast message is implemented.

In an example embodiment, the transmission opportunity included in the transmission opportunity group or the transmission opportunity group set indicated in the second message further includes a resource used to carry a message from the second node and a resource used to carry a message from the third node. In this case, the first node may perform bidirectional service interaction with both the second node and the third node. For example, the second node sends a fourth message in at least one transmission opportunity in the transmission opportunity group or the transmission opportunity group set indicated in the second message, and the third node sends a fifth message in at least one transmission opportunity in the transmission opportunity group or the transmission opportunity group set indicated in the second message.

In this embodiment, a sequence of sending messages by the first node, the second node, and the third message in a transmission opportunity is not limited, and a quantity of resources used to carry the message from the first node, a quantity of resources used to carry the message from the second node, and a quantity of resources used to carry the message from the third node are not limited.

In an example embodiment, transmission patterns of different transmission opportunities in the same transmission opportunity group are the same. That transmission patterns of two different transmission opportunities are the same means that a same quantity of resources used to transmit a message is configured in the two transmission opportunities (that is, maximum quantities of messages that can be transmitted in the two transmission opportunities are the same); and nodes that transmit messages by using the two transmission opportunities are the same. For any one of these nodes, in the two transmission opportunities, rankings of configured resources that can be used by the node to send/receive a message are the same. For example, in the two transmission opportunities, a resource appearing first is a configured resource used by the first node to send a message, and another resource is a configured resource used by the first node to receive a message from another node. Time lengths of resources for transmitting messages at a corresponding ranking in two different transmission opportunities with a same transmission pattern may be the same or may be different. For example, lengths of first transmission resources in the two transmission opportunities may be the same or may be different.

Figure 9:
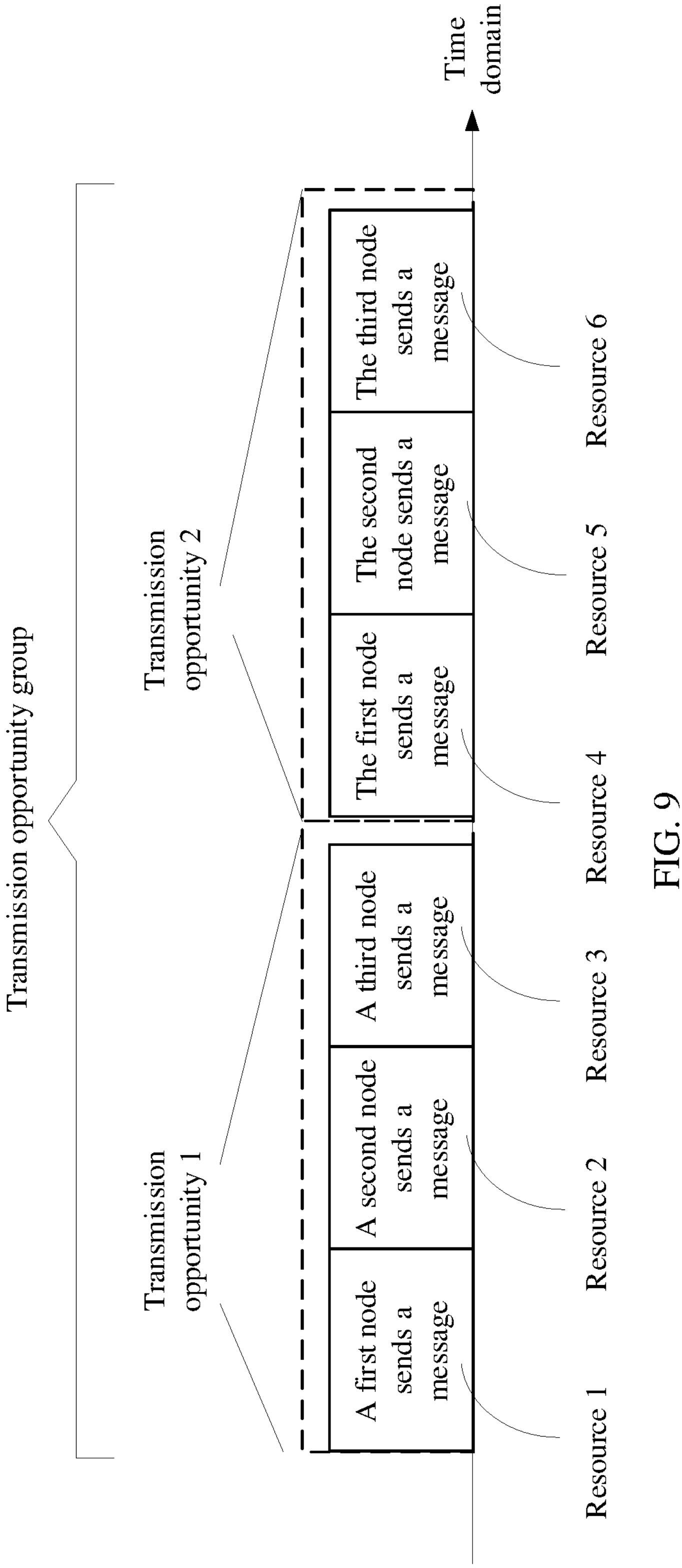
FIG. 9 is a schematic diagram of a transmission opportunity group.

For example, FIG. 9 is a schematic diagram of an example transmission opportunity group. In the transmission opportunity group, two transmission opportunities are used as an example, and a quantity of configured resources used to transmit a message in each transmission opportunity is 3. In transmission opportunities 1, 2, and 3, a resource appearing first is a configured resource used by the first node to send a message, a resource appearing second is a configured resource used by the second node to send a message, and a resource appearing third is a configured resource used by the third node to send a message.

It should be noted that transmission patterns of different transmission opportunity groups may be the same or may be different. This is not limited in this application.

In an example embodiment, the second message further indicates a sequence of the resource used to carry the message from the second node and the resource used to carry the message from the third node that are in the transmission opportunity. Correspondingly, the second node and the third node send messages in the transmission opportunity based on the sequence indicated in the second message.

Optionally, the first node may indirectly indicate, by including a sequence of the identifier of the second node and the identifier of the third node in the second message, the sequence of the resource used to carry the message from the second node and the resource used to carry the message from the third node that are in the transmission opportunity. For example, if the sequence that is of the identifier of the second node and the identifier of the third node and that is carried in the second message is that the second node is before the third node, in the transmission opportunity, the resource used to carry the message from the second node is earlier than the resource used to carry the message from the third node. That is, in the transmission opportunity, the second node first sends a message, and the third node sends a message later.

In this way, a sequence of sending messages by nodes can be determined, to avoid a conflict between messages from different nodes, so as to further improve communication reliability.

In this embodiment, the broadcast message on the broadcast frequency hopping channel may be randomized in time domain, to avoid a continuous conflict between broadcast messages from different nodes on the broadcast frequency hopping channel, so as to further improve transmission reliability.

In this embodiment, in the transmission opportunity group, short-term transmission interruption caused due to transmission of the broadcast message on the broadcast frequency hopping channel is allowed. For example, if in any transmission opportunity group, the second node does not receive a message from the first node within a preset duration, the second node determines that the transmission opportunity group is unavailable. The preset duration may be a time length of N consecutive transmission opportunities, or a time length of L timeslots, where N and L are positive integers. N or L may be specified in a protocol, preconfigured, or indicated in the second message. In this way, unnecessary power consumption waste caused by continuous monitoring of the transmission opportunity group by the second node when the transmission opportunity group is unavailable due to another reason (for example, continuous interference or active abandonment of transmission by the first node) can be avoided.

It should be understood that the foregoing implementations may be combined with each other to achieve different technical effects.

It may be understood that to implement functions of each node in the foregoing embodiments, a device on each node includes a corresponding hardware structure and/or software module for performing each function. A person skilled in the art should be easily aware that in this application, the example units and method steps described with reference to embodiments disclosed in this application can be implemented by hardware or a combination of hardware and computer software. Whether a function is performed by hardware or hardware driven by computer software depends on particular application scenarios and design constraints of the technical solutions.

Figure 10:
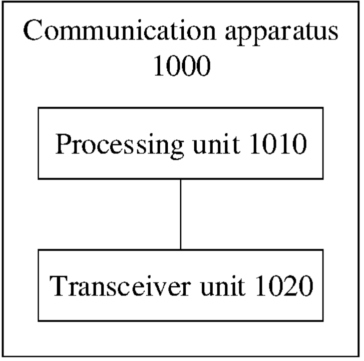
FIG. 10 is a schematic diagram of a structure of an example communication apparatus according to an embodiment of this application.
Figure 11:
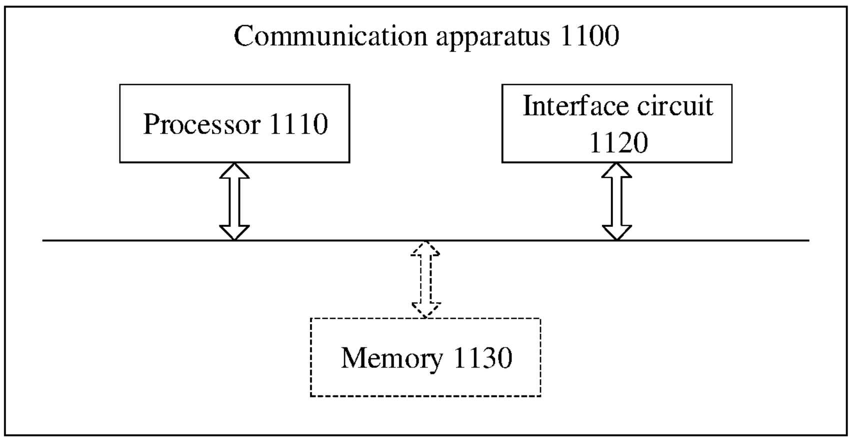
FIG. 11 is a schematic diagram of a structure of another example communication apparatus according to an embodiment of this application.

FIG. 10 and FIG. 11 each are a schematic diagram of a structure of an example communication apparatus according to an embodiment of this application. The communication apparatus may be configured to implement functions of each node in the foregoing method embodiments, and therefore can also implement beneficial effects of the foregoing method embodiments.

As shown in FIG. 10, a communication apparatus 1000 includes a processing unit 1010 and a transceiver unit 1020. The communication apparatus 1000 is configured to implement a function of the first node, the second node, or the third node in the foregoing method embodiments.

When the communication apparatus 1000 is configured to implement the function of the first node in the method embodiments, the transceiver unit 1020 is configured to send a first message on at least one broadcast frequency hopping channel, where the first message indicates a first resource on a first general frequency hopping channel; and the transceiver unit 1020 is further configured to send a second message on the first resource, where the second message indicates a transmission opportunity group or a transmission opportunity group set, the transmission opportunity group set includes at least two transmission opportunity groups, the transmission opportunity group includes at least two transmission opportunities, and the transmission opportunity includes a resource used to carry a message from the apparatus.

Optionally, the processing unit 1010 is configured to generate the first message and the second message.

When the communication apparatus 1000 is configured to implement the function of the second node in the method embodiments, the transceiver unit 1020 is configured to: receive a first message on at least one broadcast frequency hopping channel, where the first message indicates a first resource on a first general frequency hopping channel; and receive a second message on the first resource, where the second message indicates a transmission opportunity group or a transmission opportunity group set, the transmission opportunity group set includes at least two transmission opportunity groups, the transmission opportunity group includes at least two transmission opportunities, and the transmission opportunity includes a resource used to carry a message from a first node.

Optionally, the processing unit 1010 is configured to determine the transmission opportunity group or the transmission opportunity group set based on the second message.

More detailed descriptions of the processing unit 1010 and the transceiver unit 1020 may be directly obtained with direct reference to the related descriptions in the method embodiments.

As shown in FIG. 11, a communication apparatus 1100 includes at least one processor 1110 and an interface circuit 1120. The interface circuit 1120 is configured to provide information input and/or information output for the at least one processor 1110. The at least one processor 1110 implements the method in the foregoing method embodiments through a logic circuit or by executing code instructions.

The processor 1110 and the interface circuit 1120 are coupled to each other. It may be understood that the interface circuit 1120 may be a transceiver or an input/output interface. Optionally, the communication apparatus 1100 may further include a memory 1130, configured to store instructions to be executed by the processor 1110, store input data required by the processor 1110 to run instructions, or store data generated after the processor 1110 runs instructions.

When the communication apparatus 1100 is configured to implement the method shown in FIG. 4, the processor 1110 is configured to perform a function of the processing unit 1010, and the interface circuit 1120 is configured to perform a function of the transceiver unit 1020.

It may be understood that the processor in this embodiment may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

Based on a same technical concept, an embodiment of this application further provides a computer-readable storage medium. The storage medium stores a computer program or instructions. When the computer program or the instructions are executed by a communication apparatus, the method in the foregoing method embodiments is implemented.

Based on a same technical concept, an embodiment of this application further provides a computer program product, including instructions. When the instructions are run on a computer, the method in the foregoing method embodiments is performed.

All or some of the foregoing embodiments may be implemented by using software, hardware, firmware, or any combination thereof. When software is used for implementation, all or some of the foregoing embodiments may be implemented in a form of a computer program product. The computer program product includes one or more computer programs or instructions. When the computer programs or the instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium that can be accessed by the computer, or a data storage device, for example, a server or a data center, into which one or more usable media are integrated. The usable medium may be a magnetic medium, for example, a floppy disk, a hard disk, or a magnetic tape; may be an optical medium, for example, a digital video disc; or may be a semiconductor medium, for example, a solid state drive. The computer-readable storage medium may be a volatile or nonvolatile storage medium, or may include two types of storage media: a volatile storage medium and a nonvolatile storage medium.

In various embodiments of this application, unless otherwise stated or there is a logic conflict, terms and/or descriptions in different embodiments are consistent and may be mutually referenced, and technical features in the different embodiments may be combined based on an internal logical relationship between the technical features, to form a new embodiment.

In embodiments of this application, the terms "system" and "network" may be used interchangeably. "At least one" means one or more, and "a plurality of" means two or more. "And/Or" describes an association relationship between associated objects, and represents that three relationships may exist. For example, A and/or B may represent any one of the three cases: Only A exists, both A and B exist, or only B exists, where A and B may be singular or plural. In the text descriptions of this application, the character "/" usually indicates an "or" relationship between associated objects. In a formula in this application, the character "/" indicates a "division" relationship between associated objects. "Including at least one of A, B, and C" may represent: including A;

including B; including C; including A and B; including A and C; including B and C; and including A, B, and C.

In addition, unless otherwise stated, ordinal numbers such as "first" and "second" in embodiments of this application are intended to distinguish between a plurality of objects, but are not intended to limit a sequence, a time sequence, a priority, or importance of the plurality of objects. For example, a first priority criterion and a second priority criterion are merely used to distinguish between different criteria, and do not indicate a difference in content, priority, importance, or the like of the two criteria.

In addition, the terms "include" and "have" in embodiments of this application, the claims, and the accompanying drawings are not exclusive. For example, a process, a method, a system, a product, or a device that includes a series of steps or modules is not limited to the listed steps or modules, and may further include steps or modules that are not listed.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

Clearly, a person skilled in the art may make various modifications and variations to embodiments of this application without departing from the spirit and scope of this application. This application is intended to cover these modifications and variations to embodiments of this application provided that these modifications and variations fall within the scope of the claims of this application and their equivalent technologies.

What is claimed is:

1. A communication method, comprising:

receiving, by a second node, a first message on at least one broadcast frequency hopping channel, wherein the first message indicates a first resource on a first general frequency hopping channel; and receiving, by the second node, a second message on the first resource, wherein the second message indicates a transmission opportunity group or a transmission opportunity group set, the transmission opportunity group set comprises at least two transmission opportunity groups, each transmission opportunity group comprises at least two transmission opportunities, and each of the at least two transmission opportunities comprises a resource for carrying a message from a first node, wherein each of the at least two transmission opportunities further comprises a resource for carrying a message from the second node to the first node, and the second message further indicates an identifier of the second node.

2. The method according to claim 1, wherein the second message indicates the transmission opportunity group, and the second message carries:

start moment information of the transmission opportunity group;

time length information of the transmission opportunity group;

frequency hopping frequency information or frequency hopping channel information corresponding to the transmission opportunity group; and/or bandwidth information corresponding to the transmission opportunity group.

3. The method according to claim 1, wherein the second message indicates the transmission opportunity group set, start moments of transmission opportunity groups in the transmission opportunity group set are distributed at an equal interval in time domain, and the second message carries:

start moment information of at least one transmission opportunity group in the transmission opportunity group set;

time length information of at least one transmission opportunity group in the transmission opportunity group set;

frequency hopping frequency information or frequency hopping channel information corresponding to at least one transmission opportunity group in the transmission opportunity group set;

bandwidth information corresponding to at least one transmission opportunity group in the transmission opportunity group set;

information about an interval between start moments of two adjacent transmission opportunity groups in the transmission opportunity group set in time domain;

frequency hopping random seed information corresponding to at least one transmission opportunity group in the transmission opportunity group set;

clock parameter information corresponding to at least one transmission opportunity group in the transmission opportunity group set;

clock parameter information of the first resource; and/or information about a quantity of transmission opportunity groups comprised in the transmission opportunity group set.

4. The method according to claim 2, wherein the second message further carries:

information about an interval between start moments of two adjacent transmission opportunities in the transmission opportunity group in time domain; and/or information about a quantity of transmission opportunities comprised in the transmission opportunity group.

5. The method according to claim 1, further comprising:

receiving, by the second node, a third message in at least one transmission opportunity in the transmission opportunity group or the transmission opportunity group set.

6. The method according to claim 5, wherein the third message is for carrying broadcast service data and/or broadcast signaling, and the broadcast service data and/or the broadcast signaling belong/belongs to a first broadcast set; and the third message further carries:

a broadcast set identifier that indicates the first broadcast set;

an update identifier that indicates an update of information in the first broadcast set; and/or a data packet identifier that indicates a first data packet that is carried in the third message and corresponds to the first broadcast set.

7. The method according to claim 6, wherein broadcast service data and/or broadcast signaling carried in different messages transmitted in a same transmission opportunity group belong/belongs to a same broadcast set.

8. The method according to claim 1, wherein each of the at least two transmission opportunities further comprises a resource for carrying a message from a third node; and the second message further indicates an identifier of the third node and a sequence of the resource for carrying the message from the second node and the resource for carrying the message from the third node that are in the transmission opportunity.

9. The method according to claim 1, further comprising:

sending, by the second node, a fourth message in at least one transmission opportunity in the transmission opportunity group or the transmission opportunity group set.

10. The method according to claim 1, further comprising:

when, in any transmission opportunity group, the second node does not receive a message from the first node within a preset duration, determining, by the second node, that the transmission opportunity group is unavailable.

11. The method according to claim 10, wherein the preset duration is a time length of N consecutive transmission opportunities or a time length of L timeslots, wherein N and L are positive integers.

12. A communication apparatus, comprising:

at least one processor; and at least one memory coupled to the at least one processor and storing programming instructions that, when executed by the at least one processor, cause the communications apparatus to:

send a first message on at least one broadcast frequency hopping channel, wherein the first message indicates a first resource on a first general frequency hopping channel;

send a second message on the first resource, wherein the second message indicates a transmission opportunity group or a transmission opportunity group set, the transmission opportunity group set comprises at least two transmission opportunity groups, each transmission opportunity group comprises at least two transmission opportunities, and each of the at least two transmission opportunities comprises a resource for carrying a message from a first node on which the communication apparatus is located, wherein each of the at least two transmission opportunities further comprises a resource for carrying a message from a second node to the first mode, and the second message further indicates an identifier of the second node.

13. The communication apparatus according to claim 12, further comprising a transceiver configured to send a third message in at least one transmission opportunity in the transmission opportunity group or the transmission opportunity group set.

14. The communication apparatus according to claim 12, wherein the second message indicates the transmission opportunity group, and the second message carries:

start moment information of the transmission opportunity group;

time length information of the transmission opportunity group;

frequency hopping frequency information or frequency hopping channel information corresponding to the transmission opportunity group; and/or bandwidth information corresponding to the transmission opportunity group.

15. The communication apparatus according to claim 12, wherein the second message indicates the transmission opportunity group set, start moments of transmission opportunity groups in the transmission opportunity group set are distributed at an equal interval in time domain, and the second message carries:

start moment information of at least one transmission opportunity group in the transmission opportunity group set;

time length information of at least one transmission opportunity group in the transmission opportunity group set;

frequency hopping frequency information or frequency hopping channel information corresponding to at least one transmission opportunity group in the transmission opportunity group set;

bandwidth information corresponding to at least one transmission opportunity group in the transmission opportunity group set;

information about an interval between start moments of two adjacent transmission opportunity groups in the transmission opportunity group set in time domain;

frequency hopping random seed information corresponding to at least one transmission opportunity group in the transmission opportunity group set;

clock parameter information corresponding to at least one transmission opportunity group in the transmission opportunity group set;

clock parameter information of the first resource; and/or information about a quantity of transmission opportunity groups comprised in the transmission opportunity group set.

16. A communication apparatus, comprising:

at least one processor; and at least one memory coupled to the at least one processor and storing programming instructions that, when executed by the at least one processor, cause the communications apparatus to:

receive a first message on at least one broadcast frequency hopping channel, wherein the first message indicates a first resource on a first general frequency hopping channel; and receive a second message on the first resource, wherein the second message indicates a transmission opportunity group or a transmission opportunity group set, the transmission opportunity group set comprises at least two transmission opportunity groups, each transmission opportunity group comprises at least two transmission opportunities, and each of the at least two transmission opportunities comprises a resource for carrying a message from a first node, wherein each of the at least two transmission opportunities further comprises a resource for carrying a message from a second node on which the communication apparatus is located to the first node, and the second message further indicates an identifier of the second node on which the communication apparatus is located.

17. The communication apparatus according to claim 16, further comprising a transceiver configured to receive a third message in at least one transmission opportunity in the transmission opportunity group or the transmission opportunity group set.

18. The communication apparatus according to claim 17, wherein the transmission opportunity further comprises a resource for carrying a message from & the second node on which the communication apparatus is located, and the second message further indicates an identifier of the second node on which the communication apparatus is located; and the transceiver is further configured to:

send a fourth message in at least one transmission opportunity in the transmission opportunity group or the transmission opportunity group set.

19. The communication apparatus according to claim 17, further comprising a processor, configured to:

when, in any transmission opportunity group, the transceiver does not receive a message from the first node within a preset duration, determine that the transmission opportunity group is unavailable.

* * * * *